(12) United States Patent
Ji et al.

(10) Patent No.: US 10,839,158 B2
(45) Date of Patent: Nov. 17, 2020

(54) DYNAMICALLY LOADED PHRASE SPOTTING AUDIO-FRONT END

(71) Applicant: MOTOROLA MOBILITY LLC, Chicago, IL (US)

(72) Inventors: Zhengping Ji, Hinsdale, IL (US); Rachid Alameh, Crystal Lake, IL (US); Michael E. Russell, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 27 days.

(21) Appl. No.: 16/257,088

(22) Filed: Jan. 25, 2019

(65) Prior Publication Data

US 2020/0242198 A1 Jul. 30, 2020

(51) Int. Cl.
  *G10L 15/22* (2006.01)
  *G06F 40/289* (2020.01)
  *G10L 15/16* (2006.01)
  *G10L 15/08* (2006.01)

(52) U.S. Cl.
  CPC ............ *G06F 40/289* (2020.01); *G10L 15/16* (2013.01); *G10L 15/22* (2013.01); *G10L 2015/088* (2013.01); *G10L 2015/221* (2013.01)

(58) Field of Classification Search
  CPC ................................ G10L 15/22; G10L 15/16
  USPC ......................................................... 704/275
  See application file for complete search history.

(56) References Cited

U.S. PATENT DOCUMENTS

| | | | |
|---|---|---|---|
| 10,304,475 B1* | 5/2019 | Wang | G10L 21/0216 |
| 2012/0191449 A1* | 7/2012 | Lloyd | H04M 1/6075 704/231 |
| 2014/0244259 A1* | 8/2014 | Rosario | G10L 15/19 704/254 |
| 2018/0012593 A1* | 1/2018 | Prasad | G10L 15/08 |
| 2018/0204569 A1* | 7/2018 | Nadkar | G10L 15/22 |
| 2018/0374484 A1* | 12/2018 | Huang | G10L 15/197 |

(Continued)

OTHER PUBLICATIONS

Eagle, Nathan et al., "Common Sense Conversations: Understanding Casual Conversation Using a Common Sense Database", Artificial Intelligence, Information Access, and Mobile Computing Workshop at the 18th International Joint Conference on Artificial Intelligence (IJCAI), Acapulco, Mexico, Aug. 2003.

*Primary Examiner* — Daniel Abebe
(74) *Attorney, Agent, or Firm* — Yudell Isidore PLLC

(57) ABSTRACT

A method includes detecting, by sensors, a current context associated with an electronic device. The method includes dynamically loading a neural network and selected features into a phrase-spotting audio front-end (AFE) processor. The neural network is configured, based on the current context, with at least one domain having an associated set(s) of trigger words. The method includes detecting, audio content that matches a trigger word from among the sets of trigger words associated with the at least one selected domain. The method includes in response to detecting audio content that matches the trigger word, outputting a wake-up signal to an application processor (AP). The AFE processor utilizes less computational resources than the AP. The method includes, in response to receiving the wake-up signal, the AP waking up and performing additional computation based on the matching trigger word. The method includes outputting results of the additional computation to an output device.

20 Claims, 10 Drawing Sheets

(56) References Cited

U.S. PATENT DOCUMENTS

2019/0347328 A1* 11/2019 Rush ........................ G06F 40/30
2020/0105256 A1* 4/2020 Fainberg ................. G10L 15/32

* cited by examiner

| Table 1: Connection Values ||||||
|---|---|---|---|---|---|
| Connection Weight | Value | Connection Weight | Value | Connection Weight | Value |
| $W_1$ | 0.712 | $W_{13}$ | 0.451 | $W_{29}$ | 0.728 |
| $W_2$ | 0.355 | $W_{14}$ | 0.710 | $W_{30}$ | 0.863 |
| $W_3$ | 0.268 | $W_{15}$ | 0.429 | $W_{31}$ | 0.670 |
| $W_4$ | 1.010 | $W_{16}$ | 0.501 | $W_{32}$ | 0.407 |
| $W_5$ | 0.112 | $W_{17}$ | 0.681 | $W_{33}$ | 0.512 |
| $W_6$ | 0.855 | $W_{18}$ | 0.535 | $W_{34}$ | 0.211 |
| $W_7$ | 0.468 | $W_{19}$ | 0.283 | $W_{35}$ | 0.509 |
| $W_8$ | -0.293 | $W_{20}$ | 0.418 | $W_{36}$ | 0.204 |
| $W_9$ | 0.212 | $W_{21}$ | 0.308 | | |
| $W_{10}$ | 0.699 | $W_{22}$ | 1.119 | | |
| $W_{11}$ | 1.363 | $W_{23}$ | 0.879 | | |
| $W_{12}$ | 0.580 | $W_{24}$ | -0.464 | | |
| | | $W_{25}$ | 0.691 | | |
| | | $W_{26}$ | 0.888 | | |
| | | $W_{27}$ | -1.036 | | |
| | | $W_{28}$ | 0.776 | | |

*FIG. 6D*

DYNAMICALLY LOADED PHRASE SPOTTING AUDIO-FRONT END

BACKGROUND

1. Technical Field

The present disclosure generally relates to electronic devices with audio microphones, and more particularly to voice signal processing in such electronic devices.

2. Description of the Related Art

Mobile devices, such as smart phones, tablets, laptops or other electronic devices, oftentimes include voice recognition (VR) systems to provide hands free voice control of the device. A virtual assistant (VA) is a software application that understands natural language and completes electronic tasks in response to user inputs. For example, virtual assistants can take dictation, read a text message or an e-mail message, look up phone numbers, place calls, and generate reminders. Existing VA applications use a trigger word or phrase, so all requests start with a fixed set of keywords in a command/control model or a full automatic speech recognition (ASR) engine.

The full ASR engine or command/control model allow listening and processing of speech input in the form of keywords only after the trigger has been recognized. A full ASR engine has the ability to detect general speech in natural language. However, the full ASR engine has a very large memory footprint (for example, greater than 300 megabytes (MB)), and utilizes a high number of processing cycles (for example, on the order of gigaflops) that consumes a significant amount of power. To run a full ASR engine constantly on a battery-powered mobile device would result in accelerated current drain and shorter battery charge cycle.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 6D is a table of connection weight values for the example neural network structure of FIG. 6A.

DETAILED DESCRIPTION

Figure 1:
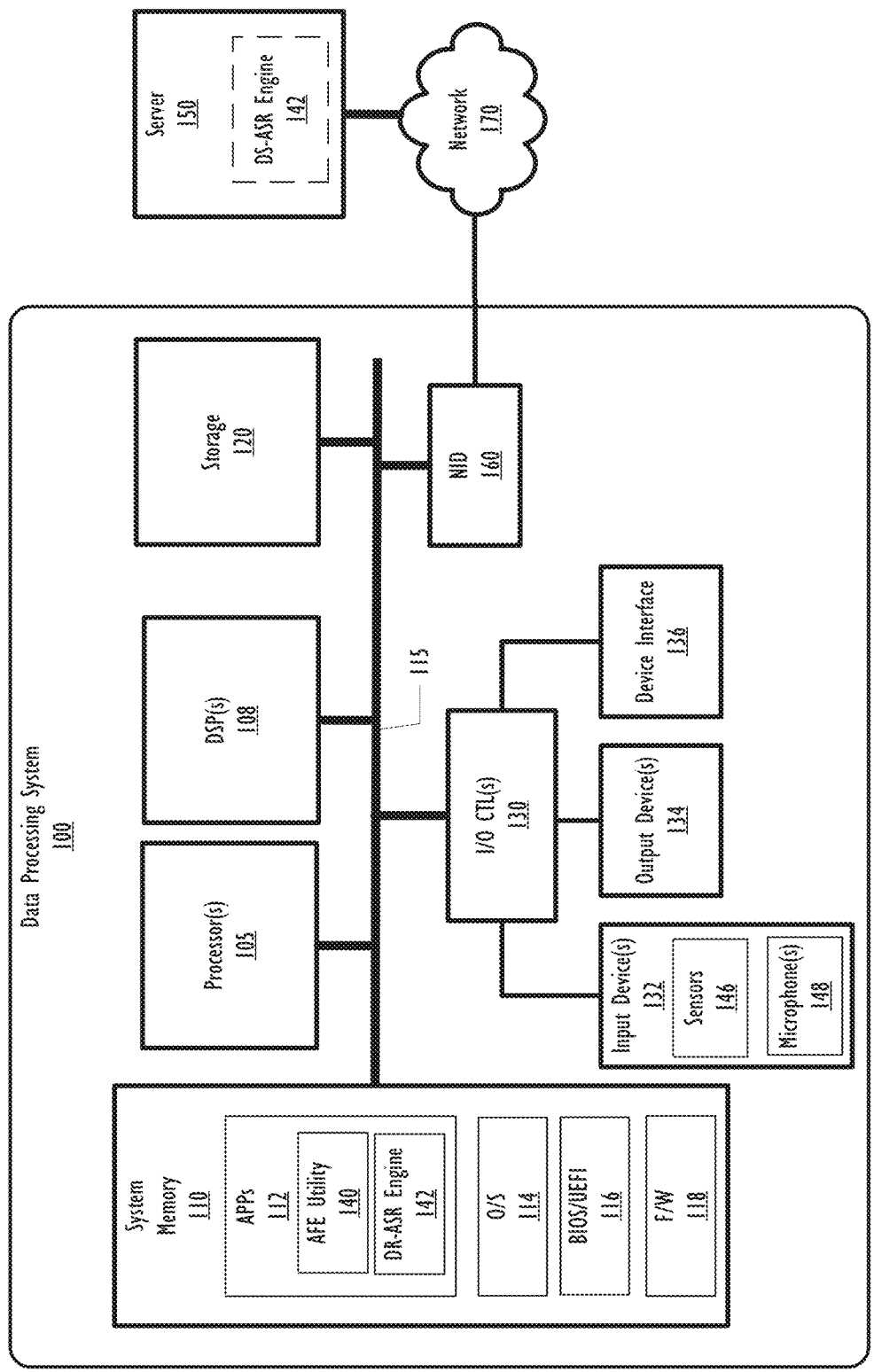
FIG. 1 is a block diagram representation of an example data processing system within which certain aspects of the disclosure can be practiced, in accordance with one or more embodiments of this disclosure.

Disclosed are a method, an electronic device, and a computer program product for operating a dynamically loaded phrase spotting audio-front end (AFE). The method includes detecting, by at least one sensor, at least one current context associated with an electronic device. The method includes dynamically loading at least one neural network and selected features into a phrase-spotting AFE processor. The neural network is configured, based on the current context, with at least one domain that has an associated set of at least one trigger word. The phrases "trigger word," "trigger phrase," "keyword," and "keyphrase" can be used interchangeably. The method includes detecting, within a received audio stream, audio content that matches a trigger word from among the sets of trigger words associated with the at least one selected domain. The detecting is performed using the at least one neural network. The method includes, in response to detecting audio content that matches the trigger word, outputting a wake-up signal from the AFE processor to an application processor (AP).

In conventional applications, the AP would be the device performing these initial detection and domain selection features functions using a full ASR engine. In embodiments of this disclosure, the AFE processor passively listens to a continuous stream of received audio and determines whether audio content that matches the trigger word is detected, all while consuming less computational resources than would the AP using the full ASR engine. Meanwhile, the AP is allowed to sleep (utilizing less computational resources than when actively performing the monitoring processes) until the AP receives the wake-up signal from the AFE processor.

The method includes, in response to receiving the wake-up signal, the AP waking up and performing additional computation based on the matching trigger word and the at least one current context. The method also includes outputting, by the AP to an output device, one or more results of the additional computation that are associated with the matching trigger word and the at least one current context. According to one aspect, because the AFE processor utilizes less computational resources than the AP, implementation of the context detection, domain selection, and trigger word matching at the AFE (rather than by the AP) enables lower power consumption by the electronic device. In one embodiment, the AFE processor can be embodied as a digital signal processor (DSP), which utilizes memory capacity and computer processing speed that are orders of magnitude less than the AP. Utilizing less computational resources results in a lower power consumption rate, which reduces the rate of current drain and extends (or leads to longer) battery charge cycle of the electronic device.

According to another embodiment, an electronic device includes at least one sensor that detects at least one current context associated with the electronic device. The electronic device includes a memory storing a contextual loader module that dynamically loads at least one neural network and selected features into a phrase-spotting audio front-end (AFE) processor. The neural network is configured, based on the current context, with at least one domain that has an associated set of at least one trigger word. The electronic device also includes an application processor (AP), and an output device. The AFE processor is operably coupled to the at least one sensor, the memory, and the AP. The AFE processor executes the contextual loader module, which enables the electronic device to dynamically load the at least one neural network and the selected features into the AFE processor. The AFE processor detects, within a received audio stream, audio content that matches a trigger word from among the sets of trigger words associated with the at least one selected domain. The detecting is performed using the at least one neural network. The AFE processor, in response to detecting audio content that matches the trigger word within the received audio stream, transmits a wake-up signal to an application processor (AP). The wake-up signal triggers the AP to perform additional computation based on the matching trigger word and the at least one current context. The AP outputs, to the output device, one or more results of the additional computation that are associated with the matching trigger word and the at least one current context.

According to the present disclosure, an electronic device configured for audio signal processing uses context to dynamically load the most likely trigger words of interest from a feature pool into a low power AFE processor that has limited memory. The embodiments of the present disclosure provide a context-to-domain mapping module that stores multiple domains that are selectable by the electronic device, and select, based on a current context, contextually relevant domains from among the multiple selectable domains. According to embodiments of this disclosure, the context can be any one or combination of the electronic device's time, date, location, environment, weather, or motion. The embodiments of the present disclosure provide a contextual loader module that dynamically loads various combinations of at least one neural network and selected features based on the selected contextually relevant domains. The selected features loaded into the at least one neural network enables the electronic device to detect contextually-relevant trigger words, beyond merely detecting one general trigger or limited-phrases or structured commands. By expanding the trigger words of the phrase spotting algorithm, users are allowed to speak, without waiting between the trigger phrase and the command. By classifying trigger words into domains, the embodiments of this disclosure enable domain-specific automatic speech recognition (DS-ASR) system performance to be greatly improved, including providing a lower occurrence of false triggers, a lower occurrence of missed recognition of user speech, and more accurate response. By using the current context of the electronic device as a basis for dynamically loading features of which phrases the AFE is configured to detect, the electronic device can utilize lower computational resources (i.e., of a DSP or other low power computing engine) to detect an expanded amount of trigger words. By utilizing lower computational resources of the AFE, current drain is reduced and battery power is saved.

In the following description, specific example embodiments in which the disclosure may be practiced are described in sufficient detail to enable those skilled in the art to practice the disclosed embodiments. For example, specific details such as specific method sequences, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates a block diagram representation of a data processing device, specifically data processing system (DPS) 100, within which one or more of the described features of the various embodiments of the disclosure can be implemented. DPS 100 may be a handheld device, personal computer, a server, a network storage device, or any other suitable device, and may vary in size, shape, performance, functionality, and price.

Referring specifically to FIG. 1, example DPS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown).

In one embodiment, storage 120 can be a hard drive or a solid-state drive. The one or more software and/or firmware modules within storage 120 can be loaded into system memory 110 during operation of DPS 100. The various software and/or firmware modules have varying functionality when their corresponding program code is executed by processor(s) 105 or other processing devices within DPS 100. In some embodiments, DPS 100 includes other processing devices, such as digital signal processor(s) (DSP) 108 that executes program code of the various software and/or firmware modules of DPS 100. In the embodiment shown in FIG. 1, processor(s) 105 is an application processor (AP), and DSP 108 utilizes less computational resources than the AP in terms of memory storage, processing speed, and power consumption rate.

As shown, system memory 110 can include therein a plurality of software and/or firmware modules including application(s) 112, operating system (O/S) 114, basic input/output system/unified extensible firmware interface (BIOS/UEFI) 116, and other firmware (F/W) 118.

DPS 100 also includes audio front end (AFE) utility 140. AFE utility 140 may be provided as an application that is optionally located within system memory 110 and executed by DSP 108. Within this embodiment, DSP 108 executes AFE utility 140 to provide the various methods and functions described herein. AFE utility 140 performs the functions of a phrase spotting system. It is, however, understood that DSP 108 executes AFE utility 140 to provide the various methods and functions described herein. For simplicity, AFE utility 140 is illustrated and described as a stand-alone or separate software/firmware/logic component, which provides the specific functions and methods described herein. However, in at least one embodiment, AFE utility 140 may be a component of, may be combined with, or may be incorporated within OS 114, and/or with one or more applications 112. Additional aspects of AFE utility 140, and functionality thereof, are presented within the description of FIGS. 2-7.

DPS 100 also includes domain-specific automatic speech recognition (DS-ASR) engine 142. DS-ASR engine 142 may be provided as an application that is optionally located within system memory 110 and executed by processor 105. Within this embodiment, processor 105 executes DS-ASR engine 142 to provide post application processor wake-up processes described herein. DS-ASR engine 142 performs the functions of one or more domain-specific audio speech recognition engines. s DS-ASR engine 142 is illustrated and described as a stand-alone or separate software/firmware/logic component, which provides the specific functions and methods described herein. However, in at least one embodiment, DS-ASR engine 142 may be a component of, may be combined with, or may be incorporated within OS 114, and/or with one or more applications 112. Additional aspects of DS-ASR engine 142, and functionality thereof, are presented within the description of FIGS. 2-7. In some embodiments, DS-ASR engine 142 is optionally also stored within server 150 and executed by a processor associated with server 150. According to various embodiments of this disclosure, DS-ASR engine 142 could be an independent application, or a system application, or a hardware component of the DPS 100 itself.

DPS 100 further includes one or more input/output (I/O) controllers 130, which support connection by, and processing of signals from, one or more connected input device(s) 132, such as a keyboard, mouse, touch screen, sensors 146, and microphone 148. Sensors 146 detect or measure current context of DPS 100, such as location, time, and environmental conditions at the moment of domain selection, motion of DPS 100, and the like. Microphone 148 detects oral speech of a user and other sounds in the form of sound waves. I/O controllers 130 also support connection to and forwarding of output signals to one or more connected output devices 134, such as a display, or audio speaker(s). Additionally, in one or more embodiments, one or more device interface(s) 136, such as an optical reader, a universal serial bus (USB), a card reader, Personal Computer Memory Card International Association (PCMIA) slot, and/or a high-definition multimedia interface (HDMI), can be coupled to I/O controllers 130 or otherwise associated with DPS 100. Device interface(s) 136 can be utilized to enable data to be read from or stored to additional devices (not shown) for example a compact disk (CD), digital video disk (DVD), flash drive, or flash memory card. In one or more embodiments, device interface(s) 136 can further include General Purpose I/O interfaces, such as an Inter-Integrated Circuit ($I^2C$) Bus, System Management Bus (SMBus), and peripheral component interconnect (PCI) buses.

DPS 100 further comprises a network interface device (NID) 160. NID 160 enables DPS 100 to communicate and/or interface with other devices, services, and components that are located external (remote) to DPS 100, for example, server 150, via a communication network. These devices, services, and components can interface with DPS 100 via an external network, such as example network 170, using one or more communication protocols. Network 170 can be a local area network, wide area network, personal area network, signal communication network, and the like, and the connection to and/or between network 170 and DPS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
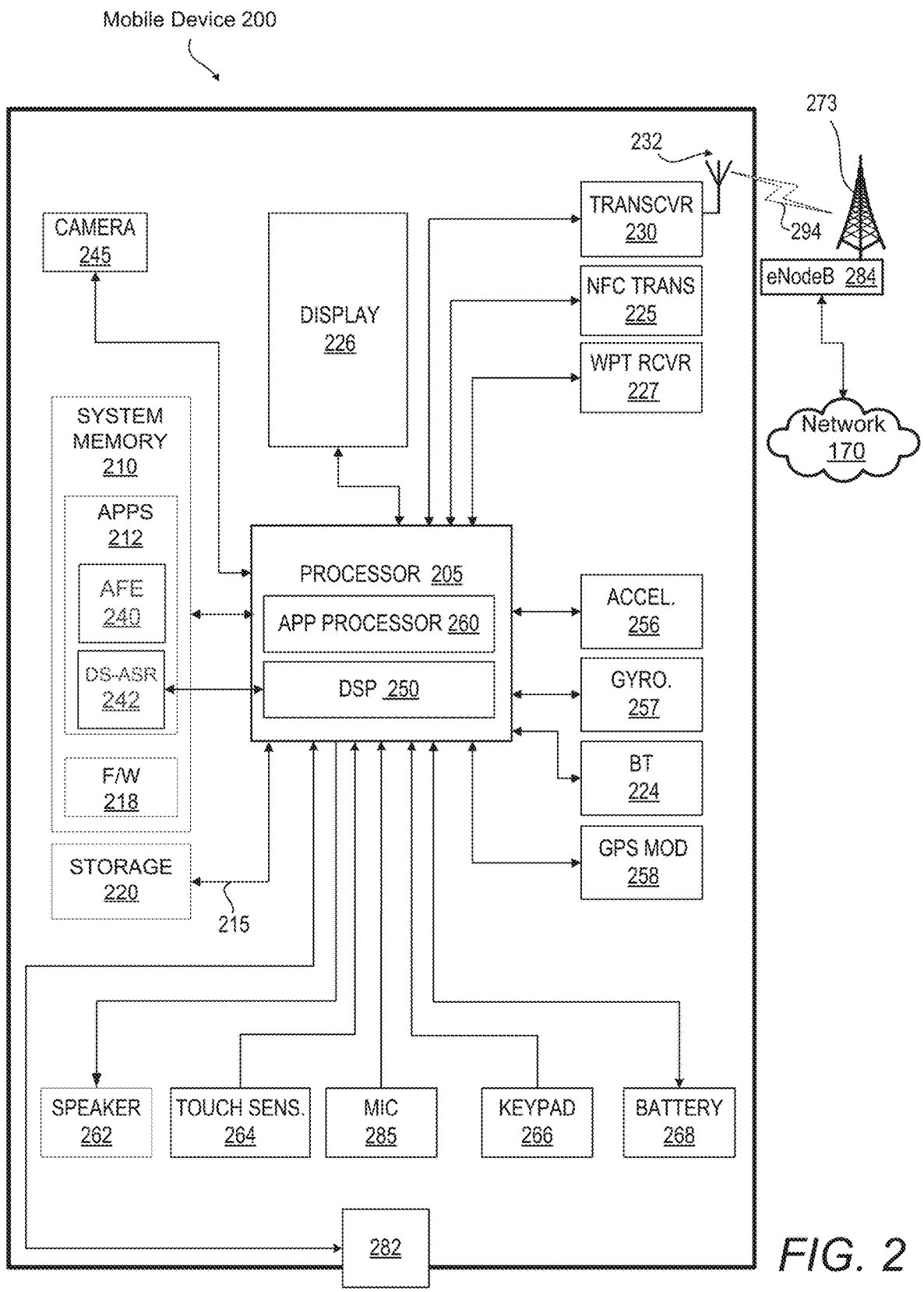
FIG. 2 illustrates a mobile device within which certain aspects of the disclosure can be practiced, in accordance with one or more embodiments of this disclosure.

In the description of the following figures, reference is also occasionally made to specific components illustrated within the preceding figures, utilizing the same reference numbers from the earlier figures. With reference now to FIG. 2, there is illustrated example mobile device 200. The embodiment of mobile device 200 illustrated in FIG. 2 is for illustration only.

Mobile device 200 includes at least one processor integrated circuit, processor 205. Included within processor 205 are DSP 250 and application processor 260. Processor 205 is coupled to system memory 210 and non-volatile storage 220 via a system communication mechanism, such as system interconnect 215. System interconnect 215 can be interchangeably referred to as a system bus, in one or more embodiments. One or more software and/or firmware modules can be loaded into system memory 210 during operation of mobile device 200. Specifically, in one embodiment, system memory 210 can include therein a plurality of such modules, including firmware (F/W) 218. System memory 210 may also include basic input/output system and an operating system (not shown). The software and/or firmware modules provide varying functionality when their corresponding program code is executed by processor 205 or by secondary processing devices within mobile device 200.

Processor 205 supports connection by and processing of signals from one or more connected input devices such as camera 245, touch sensor 264, microphone 285, and keypad 266. Processor 205 also supports connection by and processing of signals to one or more output devices, such as speaker 262 and display 226, which could be the same or similar to output devices 134 of FIG. 1. Additionally, in one or more embodiments, one or more device interfaces 282, such as an optical reader, a universal serial bus (USB), a card reader, Personal Computer Memory Card International Association (PCMIA) slot, and/or a high-definition multimedia interface (HDMI), can be associated with mobile device 200. Mobile device 200 also contains a power source such as a battery 268 that supplies power to mobile device 200.

Mobile device 200 further includes Bluetooth transceiver 224, global positioning system module (GPS MOD) 258, gyroscope 257, accelerometer 256, and various other sensors, all of which are communicatively coupled to processor 205. Bluetooth transceiver 224 enables mobile device 200 and/or components within mobile device 200 to communicate and/or interface with other devices, services, and components that are located external to mobile device 200. GPS MOD 258 enables mobile device 200 to communicate and/or interface with other devices, services, and components to send and/or receive geographic position information. Gyroscope 257 communicates the angular position of mobile device 200 using gravity to help determine orientation. Accelerometer 256 is utilized to measure non-gravitational acceleration and enables processor 205 to determine velocity and other measurements associated with the quantified physical movement of a user.

Mobile device 200 is presented as a wireless communication device. As a wireless device, mobile device 200 can transmit data over wireless network 170. Mobile device 200 includes transceiver 230, which is communicatively coupled to processor 205 and to antenna 232. Transceiver 230 allows for wide-area or local wireless communication, via wireless signal 294, between mobile device 200 and evolved node B (eNodeB) 284, which includes antenna 273. Mobile device 200 is capable of wide-area or local wireless communication with other mobile wireless devices or with eNodeB 284 as a part of a wireless communication network. Mobile device 200 communicates with other mobile wireless devices by utilizing a communication path involving transceiver 230, antenna 232, wireless signal 294, antenna 273, and eNodeB 284. Mobile device 200 additionally includes near field communication transceiver (NFC TRANS) 225 wireless power transfer receiver (WPT RCVR) 227. In one embodiment, other devices within mobile device 200 utilize antenna 232 to send and/or receive signals in the form of radio waves. For example, GPS module 258 can be communicatively coupled to antenna 232 to send/and receive location data.

As provided by FIG. 2, mobile device 200 additionally includes AFE utility 240. AFE utility 240 may be provided as an application that is optionally located within the system memory 210 and executed by processor 205. Within this embodiment, DSP 208 executes AFE utility 240 to provide the various methods and functions described herein. As such, DSP 208 can be referred to as an AFE processor. AFE utility 240 enables mobile device 200 to perform the functions of a phrase spotting system. It is, however, understood that DSP 208 executes AFE utility 240 to provide the various methods and functions described herein. In at least one embodiment, AFE utility 240 may be a component of, may be combined with, or may be incorporated within one or more applications 212.

As provided by FIG. 2, mobile device 200 additionally includes DS-ASR engine 242. DS-ASR engine 242 may be provided as an application that is optionally located within the system memory 210 and executed by processor 205. Within this embodiment, processor 205 executes DS-ASR engine 242 to provide the post application processor wake-up processes described herein. DS-ASR engine 242 performs the functions of a domain-specific automatic speech recognition engine. DS-ASR engine 242 may be referred to as simply DS-ASR engine 242. In at least one embodiment, DS-ASR 242 may be a component of, may be combined with, or may be incorporated within one or more applications 212.

Figure 3:
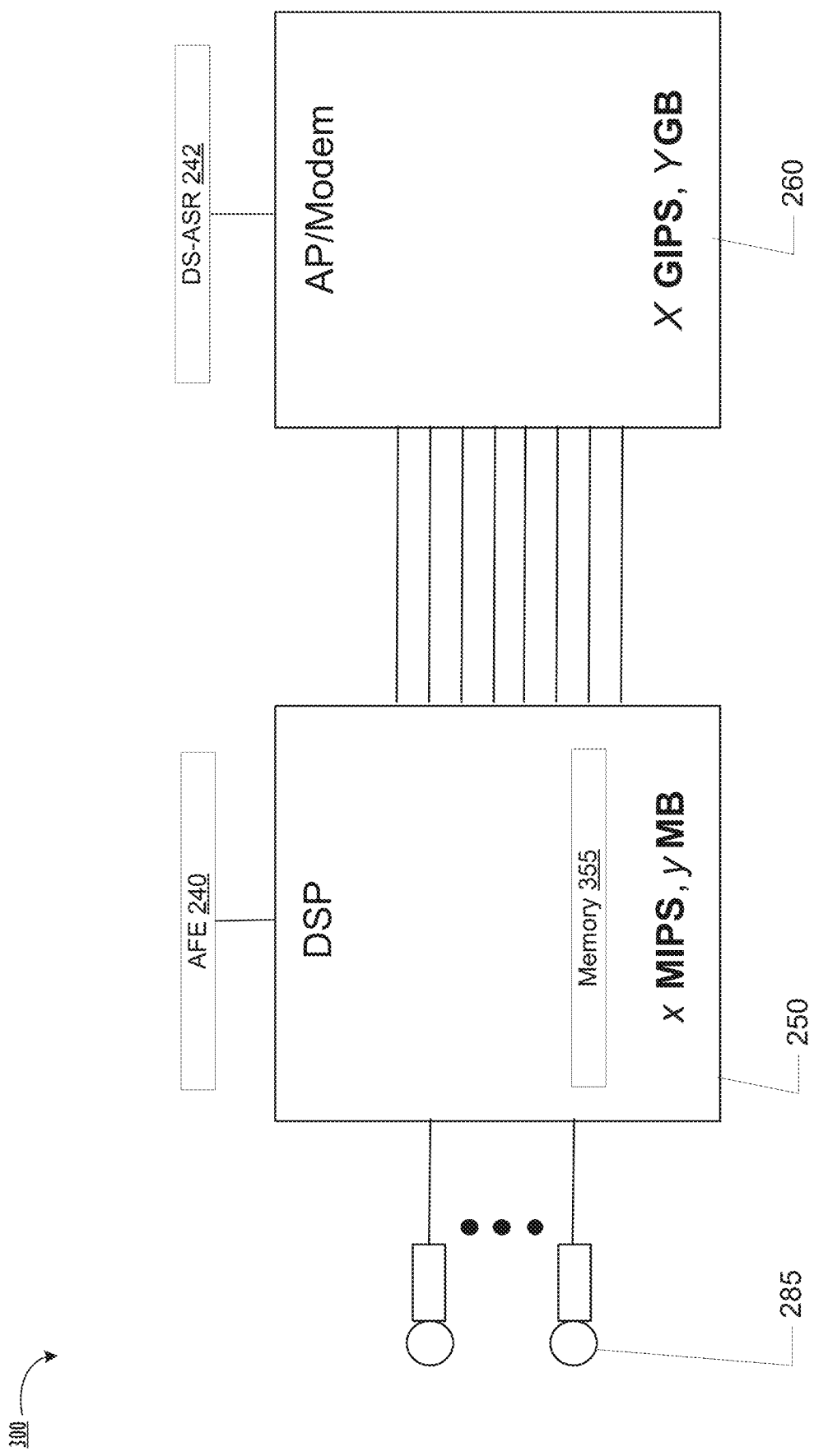
FIG. 3 illustrates a dynamically loaded phrase spotting audio-front end system of a mobile device, in accordance with one or more embodiments of this disclosure.

With reference now to FIG. 3, there is illustrated side-by-side comparative view 300 of DSP 250 that implements AFE utility 240 and application processor (AP) 260 that implements DS-ASR engine 242 of a mobile device (e.g., mobile device 200 of FIG. 2), in accordance with one or more embodiments of this disclosure. The embodiments of AFE utility 240 and DS-ASR engine 242 illustrated in FIG. 3 are for illustration only. AFE utility 140 and DS-ASR engine 142 of FIG. 1 and AFE utility 240 and DS-ASR engine 242 of FIG. 2 could have the same or similar configuration. The AFE utility 140 and DS-ASR engine 142 of FIG. 1 could be alternatively utilized in place of AFE utility 240 and DS-ASR engine 242 of FIG. 2, respectively.

The example AFE utility 240 shown in FIG. 3 can be stored on or executed by DSP 250 or other low power computing engine. DSP 250 has an internal memory 355 with a predetermined capacity of a number of megabytes (MB), such as 512 MB. DSP 250 has a processing speed that is a number of million integer operations per seconds (MIPS).

The example DS-ASR 242 shown in FIG. 3 can be executed by an application processor (AP) 260. AP 260 has a predetermined memory capacity of a number of gigabytes (GB), such as 500 GB. AP 260 has a processing speed that is a number of billion integer operations per seconds (BIPS). AP 260 utilizes greater computational resources than DSP 250. More particularly, the processing speed (i.e., measured in IPS) and memory capacity (i.e., measured in either bits or bytes) of AP 260 is two or three orders of magnitude greater than DSP 250. Accordingly, AP 260 has a higher power consumption rate than DSP 250.

An ASR engine running a full deep neural network (DNN) has a compressed memory footprint of about 300 MB and requires around 1.2 GFLOPs (i.e., billion floating point operations) for calculating probabilities that define inferences. To run DS-ASR (such as DS-ASR 142 of FIG.

1, or DS-ASR 242 of FIG. 2) constantly on a battery-powered device would cause mobile device 200 to experience rapid current drain and would cause an accelerated end of battery charge cycle. As a technical solution, embodiments in accordance with this disclosure execute some tasks utilizing AFE utility 240, which is executed by a lower power consuming DSP 250. In accordance with embodiments of this disclosure, AFE utility 240 performs the tasks of first identifying when a word or phrase of interest is detected by microphone(s) 285 and received by the phrase-spotter in AFE utility 240 before waking up the higher power consuming AP 260 from sleep state in order to execute DS-ASR 242. By providing initial voice detection and trigger word detection using the lower power consuming AFE processor (such as DSP 250), DS-ASR 242 is not required to be constantly running on the higher power consuming AP 260. Thus, AFE utility 240 executing on the lower computational resource consuming AFE processor provides technical advantages such as lower overall power consumption and longer device operation.

Due to memory limitations on DSP 250, only a limited number of domains (i.e., less than can be stored on main memory) can be stored in the memory 355 of DSP 250 by AFE utility 240. The limit on the number of domains is in part caused by the following facts: (i) the various domains are categories into which each keyword that AFE utility 240 is able to detect is assigned; (ii) AFE utility 240 is able to detect multiple keywords from multiple domains; and (iii) for each keyword that AFE utility 240 is able to detect, an amount of memory is required to store keyword-specific features that are utilized by AFE utility 240 to recognize that specific keyword. The capacity of DSP memory 355 limits the quantity of features that can be stored, which limits the quantity of keywords that AFE utility 240 can recognize, which, in turn, limits the number of domains that can be stored in DSP memory 355. As a result, only a small portion of the domains can be concurrently selected for use by a phrase-spotter (either based on keywords or characteristics of the speech). DSP memory 355 stores the limited number of domains, such as the domains shown in FIG. 5. In light of the fact that not all domains can be loaded on the AFE utility 240, as a technical solution and in accordance with embodiments of this disclosure, only the ASR domains that are most likely to be relevant at the time are dynamically loaded into the phrase-spotter on AFE utility 240. According to one aspect, the current context of the device and/or the user is utilized in determining which domains are relevant for loading into the phrase spotter (such as phrase-spotter 418 of FIG. 4).

Figure 4:
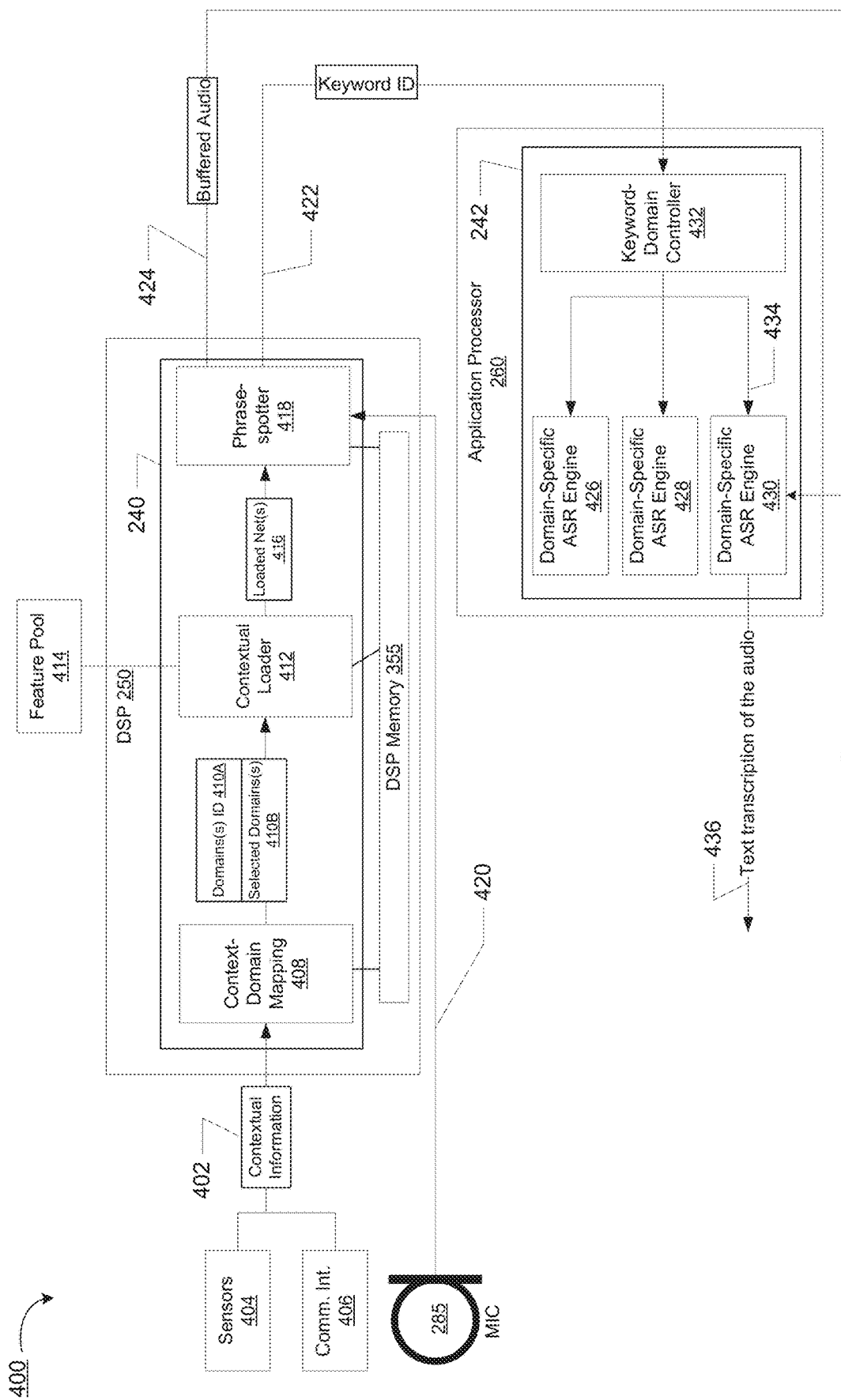
FIG. 4 illustrates additional component level details of the dynamically loaded phrase spotting audio-front end system of FIG. 3, in accordance with one or more embodiments of this disclosure.

With reference now to FIG. 4, there is illustrated the dynamically loaded phrase spotting audio-front end (DLPSAFE) system 400 presenting additional details of DSP 350 executing AFE utility 240 and AP 260 executing DS-ASR engine 242 of FIG. 3, in accordance with one or more embodiments of this disclosure. Although stored in system memory 210 and accessed through system interconnect 215, for ease of explanation, additional component level details of the AFE utility 240 and DS-ASR engine 242 are shown as being executed inside DSP 250 and AP 260, respectively. AFE utility 240 receives contextual information 402 from sensors 404 of the mobile device (e.g., mobile device 200). As utilized herein, contextual information 402 identifies current context associated with the mobile device. For example, sensors 404 can include GPS MOD 258, gyroscope 257, or accelerometer 256 of FIG. 2. Sensors 404 can also include a barometer, ambient noise sensor, proximity sensor, and the like. Sensors 404 detect at least one current context associated with the mobile device and send or forward contextual information 402 to AFE 240. For example, sensors 404 can send contextual information 402 identifying that the current context includes the location of the mobile device, environment of the mobile device, or motion of the mobile device.

In some embodiments, AFE utility 240 additionally or alternatively receives contextual information 402 through communication with another device. For example, AFE utility 240 can receive contextual information 402 via communication through a communication interface 406, such as device interface 282 or through transceiver 230 of mobile device 200. For example, a server, such as server 150 of FIG. 1, can communicate with AFE utility 240 through communication interface 406 over the Internet or other communication network 170 in order to send contextual information 402 identifying the time, the date, the weather, and the like as current context.

AFE utility 240 includes a context-to-domain mapping module 408 that receives contextual information 402 and determines the current context associated with mobile device 200. Context-to-domain mapping module 408 stores multiple domains (for example, a number N of selectable domains) that are selectable by a processor (such as by processor 205) of the mobile device. For each of the selectable domains stored, the context-to-domain mapping module 408 also stores a relationship with different context combinations. That is, context-to-domain mapping module 408 stores a map of relationships between each of the selectable domains and each detectable context that can be detected by sensors 404 or that can be received through communication interface 406. More particularly, different context combinations are mapped in memory 355 of the DSP 250 to a set of at least one selectable domain. For example, a context combination of "home" location and "morning" time is, in general, related to the weather domain and "food" domain. Generally, people search for food-related information as inputs to decisions about getting rid of morning hunger and search for weather-related information as inputs to decisions about commute route and attire to wear that day. As another example, a context combination of "home" location, "weekend" date, and "evening" time is, in general, related to the sports domain and food domain, as people generally watch spectator sports while home on weekends and order food while watching sports. In some embodiments, context-to-domain mapping module 408 stores, for each set of multiple domains (namely, subsets of the N selectable domains 502-520 of FIG. 5), a relationship with each detectable context that can be detected by sensors 404 or received via the communication interface 406.

Context-to-domain mapping module 408 selects at least one selectable domain that corresponds to the received contextual information 402 and sends an identification 410A of selected domains 410B to contextual loader module 412 of AFE utility 240. Contextual loader module 412 receives identification 410A of selected domains 410B, and selects, from a feature pool 414, features that have a relationship to selected domains 410B. Feature pool 414 contains all features for all of the N selectable domains stored in memory 355 of DSP 250. In some embodiments, AFE utility 240 includes feature pool 414 in memory 355 of DSP 250, and in other embodiments, feature pool 414 is accessed by AFE utility 240 but is not stored in memory 355 of DSP 250. A feature is an interpreter of a waveform. In this disclosure, "features" means neural network connection weights, number of layers in a neural network, number of nodes in each layer of the neural network, and the node thresholds for each node. A neural network is a way to organize features for better understanding of an audio utterance (e.g., audio frame, or audio content). For example, acoustic-type features can be used to make speech/non-speech decisions about the audio utterance. As another example, features can be used to detect whether a predefined keyword was spoken within an audio stream. Features can be arranged in a hierarchical order. For example, features can be arranged in layers within a neural network. For each of the N selectable domains, feature pool 414 stores relationships to features that correspond to the set of trigger words associated with that selectable domain. As a technical advantage of embodiments of this disclosure, there is no need for AFE utility 240 to select keywords, because each selectable domain is associated with a set of one or more predefined keywords. The relationship between keyword-specific features to a domain enables detection of keywords associated with the domain by selecting only the domain and keyword-specific features. A detailed description of the map of domain-to-features relationships can be found below in association with FIG. 5.

In one or more embodiment, contextual information 402 can include an identification of a user of the mobile device (e.g., two spouses having first and second user identifications). For example, context-to-domain mapping module 408 can select a first domain (e.g., "restaurants near wife's workplace" domain) that is associated with a first user identification (e.g., wife's name) when contextual information 402 includes the first user identification (wife's name). Alternatively, context-to-domain mapping module 408 can select a second domain (e.g., "restaurants near husband's workplace" domain) when the contextual information 402 includes the second user identification (e.g., husband's name).

For another example, context-to-domain mapping module 408 can select selected domain(s) 410B by one of: (i) selecting a first set of domains as selected domain 410B, in response to contextual information 402 identifying that the at least one current context in the context combination includes: a first context from among the at least one current context, the first context being within a first context range; and a second, different context from among the at least one current context, the second context being within a second context range, where the set of trigger words associated with the first set of domains includes trigger words associated with the first context and trigger words that are associated with the second context; and (ii) alternatively selecting a second set of domains as the at least one domain, in response to the contextual information identifying that the at least one current context includes at least one of the first context and the second context outside a respective one of the first context range and the second context range. As described more particularly below, examples of a context range include but are not limited to an upper battery power level range, a lower battery power level range, an upper ambient noise level range, and a threshold lower ambient noise level. For any context measured by or received through sensors 404 or communication interface 406, a context range is a portion of the measurement range of sensors 404 or portion of the possible measurements that can be received through communication interface 406 that cause context-to-domain mapping module 408 to select a particular domain. For example, a first context range for the context of an identification of a user of the mobile device could be a first user identification (e.g., wife's name), and a second context range for the context of an identification of a user of the mobile device could be a second user identification (e.g., husband's name). When contextual information 402 includes a user identification, context-to-domain mapping module 408 selects either a first domain or a second domain depending upon whether the user identification matches the criteria of the first context range (e.g., matching wife's name) or matches the criteria of the second context range (e.g., matching husband's name), respectively.

Contextual loader module 412 loads the selected features into at least one neural network 416. Contextual loader module 412 stores one or more neural network structures that can be utilized in deciding whether an audio stream contains audio content that matches a predefined keyword, the keyword being detectable by using the features selected from feature pool 414. In some embodiments, contextual loader module 412 stores a multi-domain neural network structure that is configured (e.g., trained) to be used together with a phrase spotting algorithm to detect keywords that are related to the multiple domains stored in the context-to-domain mapping module 408, such as the N selectable domains stored on DSP 250.

In other embodiments, contextual loader module 412 stores multiple domain-specific neural network structures. For example, contextual loader module 412 can store a domain-specific neural network structure for a weather domain (e.g., weather domain 502 in FIG. 5) and store another domain-specific neural network structure for a sports domain (e.g., sports domain 504 in FIG. 5). The weather domain-specific neural network structure is configured (e.g., trained) to be used together with a phrase-spotting algorithm to detect keywords that are related to weather. The sports domain-specific neural network structure is configured to be used together with a phrase-spotting algorithm to detect keywords that are related to sports. For example, a phrase spotting algorithm can more accurately detect weather-related keywords (e.g., "rain," "sunshine," or "temperature") if used together with the weather domain-specific neural network structure than if used with the sports domain-specific neural network structure. When contextual loader module 412 stores multiple domain-specific neural network structures, contextual loader module 412 loads the selected features into the neural network structure(s) configured to be used together with a phrase-spotting algorithm to detect keywords that are related to selected domains 410B. For example, contextual loader module 412 can select domain-specific neural network structures into which the selected features will be loaded, leaving a remainder of the domain-specific neural network structures in a sleep state.

AFE utility 240 includes a phrase-spotter 418 that receives an audio stream 420 and processes online audio streams (such as received audio stream 420) in order to determine whether the received audio stream 420 contains audio content that matches a trigger word from among the sets of trigger words associated with selected domains 410B. Particularly, phrase-spotter 418 detects audio content that matches a trigger word from among the sets of trigger words associated with selected domains 410B. As a result of such detection, AFE utility 240 determines that a word or phrase of interest was spoken and heard by microphones 285. The at least one neural network 416, loaded with the selected features, is used by phrase-spotter 418 to detect whether a received audio stream 420 contains audio content that matches a trigger word from among the sets of trigger words associated with selected domains 410B. Particularly, phrase-spotter 418 provides audio stream 420 as inputs to the at least one neural network 416. Phrase-spotter 418 executes phrase spotting algorithms on the inputs, using the at least one neural network 416 loaded with the selected features, and outputs to AP 260 an identification 422 of which trigger word was detected. Trigger word identification 422 can indicate which trigger word was detected and can indicate to which one of the selected domains 410B the detected trigger word belongs. By only awakening one of multiple DS-ASRs, the AP 260 can yield more accurate transcription results. Also, AP 260 reduces usage of computational processing resources and other system resources (e.g., battery power) by executing one DS-ASR compared with executing a general purpose ASR. In DS-ASR engine 240, each of the DS-ASRs 424, 426, 430 executes a smaller sized neural network (i.e., having few neural network layers, having fewer nodes per layer, and capable of detected fewer words and phrases) than a general purpose ASR that is executed in the computing-cloud. The general purpose ASR is executed utilizing cloud computing that execute a more complex and larger neural network, such as on server 150 of FIG. 1 or other computer accessed via the network 170. In some embodiments, trigger word identification 422 is a binary number indicating which trigger word among multiple pre-defined triggers is identified. In some embodiments, the trigger word identification 422 is a simple YES or NO binary signal that indicates to AP 260 which DS-ASR 42, 228, 430 to awaken or allow to remain asleep, respectively (namely, indicates which domain is detected as being heard). In some embodiments, the detected trigger word, itself, is the trigger word identification 422. Trigger word identification 422 operates as a wake-up signal to AP 260.

In some embodiments, phrase-spotter 418 includes a buffer that stores the received audio stream 420 while phrase-spotter 418 determines whether a word or phrase of interest was heard by microphones 285. Phrase-spotter 418 discards the buffered audio stream in response to determining that the buffered audio stream does not contain audio content matching any trigger word from among the sets of trigger words associated with selected domains 410B. Alternatively, phrase-spotter 418 forwards the buffered audio stream 424 to AP 260 in response to detecting audio content that matches a trigger word from among the sets of trigger words associated with selected domains 410B.

AP 260 includes multiple domain-specific ASR engines 426, 428, and 430, that each perform domain-specific speech-to-text processing, such as transcribing of a stream of audio into text format. Each of the multiple domain-specific ASR engines 426, 428, and 430 corresponds to a different one of the N selectable domains stored in AFE utility 240. For simplicity, multiple domain-specific ASR engines 426, 428, and 430 may be separately referred to as simply first DS-ASR 426, second DS-ASR 428, and third DS-ASR 430. For example, first DS-ASR engine 426 can correspond to the weather domain, and as such is configured (i.e., trained) to transcribe weather-related words more accurately than a general-purpose speech recognition engine and more accurately than other DS-ASR engines that are not trained on a substantially similar corpus of weather-related words. Second DS-ASR 428 can correspond to the sports domain. Third DS-ASR 430 can correspond to the food domain 506 (of FIG. 5).

In some embodiments, as shown in FIG. 4, DLP SAFE system 400 includes a keyword-domain controller 432 in DS-ASR 242. Keyword-domain controller 432 receives the trigger word or keyword identification (ID) 422 as a wake-up signal, and in response, wakes-up and performs additional computations based on the received trigger word identification 422 and current context. Particularly, in response to receiving trigger word identification 422, keyword-domain controller 432 selectably activates the domain-specific ASR engine (from among the multiple domain-specific ASR engines 426, 428, and 430) which corresponds to the same domain associated with the detected trigger word (i.e., trigger word identification 422). For example, if the word "McDonald's" is identified by trigger word identification 422, which is a keyword associated with the food domain 506 (of FIG. 5), then keyword-domain selector 432 selects and activates (e.g., sends an activating control signal 434 to) third DS-ASR 430, because the food domain is related to both the trigger word identification 422 and third DS-ASR 430. In response to receiving the activating control signal 434, the activated domain-specific ASR engine (such as third DS-ASR 430) performs additional computations, such as receiving and transcribing buffered audio stream 424 into text transcription 436. AP 260 outputs text transcription 436 to an output device (such as output device 134 of FIG. 1, which can include speakers 262, display 226), and/or to memory buffer/storage 220.

In other embodiments, DLPSAFE system 400 includes keyword-domain controller 432 in AFE 240, in which case, keyword-domain controller 432 outputs activating control signal 434 as a wake-up signal to AP 260, specifically, as a wake-up signal to the DS-ASR that corresponds to the same domain associated with the detected trigger word (i.e., trigger word identification 422). In response to receiving the activating control signal 434, the activated domain-specific ASR engine (such as third DS-ASR 430) wakes up and performs additional computations, such as receiving and transcribing the buffered audio stream 424 into a text transcription 436.

In certain embodiments, AFE utility 240 selectively adjusts computational complexity of the phrase spotting algorithm that is used in the detection of a trigger word within a received audio stream 420. Particularly, AFE utility 240 applies a higher computational complexity when the current context indicates that a battery power level is within an upper battery power level range (such as greater than or equal to a discrete value of battery power; or greater than 50%). AFE utility 240 can apply a higher computational complexity by selecting and loading a higher number of features from feature pool 414 into the at least one neural network 416. The selected at least one neural network can include a higher quantity of nodes or more layers. Also, AFE utility 240 applies a lower computational complexity when the current context indicates the battery power level is outside the upper battery power level range or within a lower battery power level range (such as less than a discrete value of battery power; or less than or equal to 50%). AFE utility 240 can apply a lower computational complexity by loading selected features from feature pool 414 into a neural network that include a lower quantity of nodes or that include less layers or by selecting and loading a lower number of features from feature pool 414 into the at least one neural network 416. For example, for a combination of different contexts (also referred to as "context combination") that includes a battery power level outside the upper battery power level range and one or more other context (such as time, location, etc.), context-to-domain mapping module 408 can apply a lower computational complexity by selecting a subdomain (such as basketball domain 512 of FIG. 5). The selected subdomain is related to fewer features than the superdomain (such as sports domain 504 of FIG. 5) to which the selected subdomain is part of. On the other hand, when the context combination includes a battery power level within the upper battery power level range, context-to-domain mapping module 408 can apply a higher computational complexity by selecting the superdomain, instead of the subdomain. As utilized herein, the term "superdomain" refers to (e.g., means) a domain that has multiple subdomains, each of which can be independently selected by context-to-domain mapping module 408. As an example, sports domain 504 (of FIG. 5) is a superdomain that is associated with a set of four (4) keywords {football, soccer, game, basketball}, and basketball domain 514 is a subdomain that is part of sports domain 504 and that is associated with a subset of one (1) keyword {basketball} from among the set of four (4) keywords within sports domain 504. "Domain" generally refers to these types of domain constructs as well as other single-level domains that are not subdivided into subdomains.

In certain embodiments, AFE utility 240 selectively adjust a detection quality metric of the phrase-spotting algorithm that is used by phrase-spotter 418 in the detection of the trigger word within the received audio stream 420. Particularly, phrase-spotter 418 can apply a higher detection quality metric when contextual information 402 identifies an ambient noise level within an upper ambient noise level range, and can apply a lower detection quality metric when contextual information 402 identifies an ambient noise level outside the upper ambient noise level range or below a threshold lower ambient noise level. The higher detection quality metric can require phrase-spotter 418 to set a higher minimum confidence measure threshold in order to determine that the audio stream contains audio content that matches a trigger word. The lower detection quality metric can require phrase-spotter 418 to have a lower minimum confidence measure threshold in order to determine that the audio stream 420 contains audio content that matches a trigger word.

Figure 5:
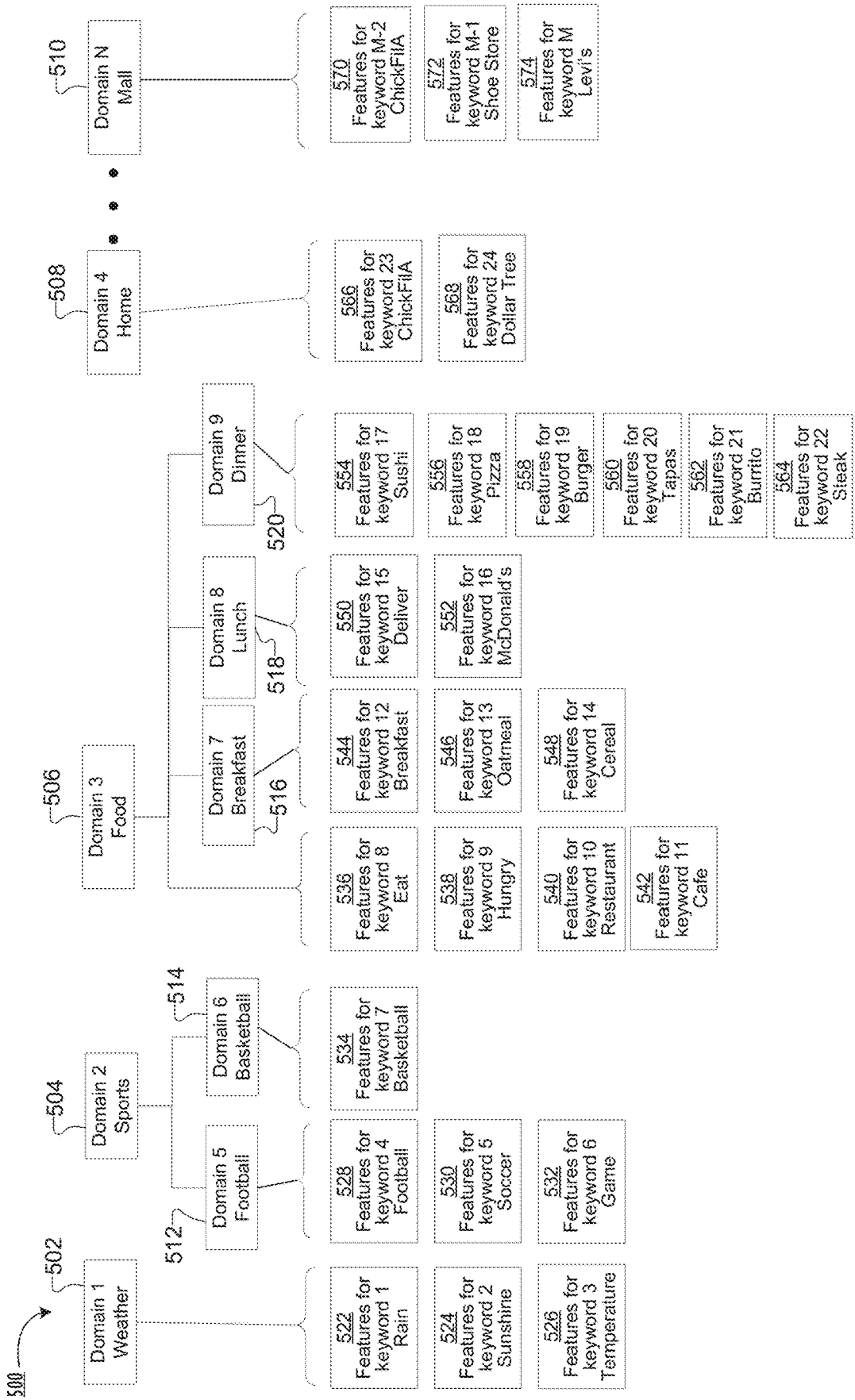
FIG. 5 illustrates relationships among domains, trigger words, and features stored in a DSP, in accordance with one or more embodiments of the disclosure.

With reference now to FIG. 5, there is provided an example domain relationship map 500 illustrating a relationship among domains, trigger words, and features stored in a DSP (such as DSP 250 of FIG. 3), in accordance with one or more embodiments of this disclosure. The illustrated relationships among domains, trigger words, and features are for illustration only. Other embodiments may have a different quantity of domains and features, or different hierarchical structures, without departing from the scope of this disclosure. The domain relationship mapping (500) described in FIG. 5 are generally described as being stored within memory 355 of DSP 250. By storing the domain relationship mapping (500) within memory 355 of DSP 250, computational resources dedicated to the AFE utility 240 can be reduced or limited.

In the illustrated embodiment, memory 355 of DSP 250 stores multiple domains (i.e., N selectable domains), including weather domain 502, sports domain 504, food domain 506, home domain 508, and mall domain 510. Each of these domains is a top-level domain, which is not part of any other domain. Additionally, sports domain 504, food domain 506, and mall domain 510 are also super domains and each includes sub-domains. As shown, sports domain 504 is subdivided and includes football domain 512 and basketball domain 514, as subdomains. Also, food domain 506 is a superdomain, which includes three subdomains: breakfast domain 516, lunch domain 518, and dinner domain 520.

Each of the N selectable domains has an associated set of at least one trigger word. Particularly, the weather domain 502 is associated with a set of trigger words {weather, rain, sunshine, and temperature}. The sports domain 504 is associated with a set of trigger words {sports, football, soccer, game, and basketball}.

Each subdomain is associated with a subset of trigger words from among the set of trigger words that are associated with the superdomain. Particularly, the football domain 512 is associated with a set of trigger words {football, soccer, and game}, which is a subset of the set of trigger words {sports, football, soccer, game, and basketball} within sports domain 504. Also, the basketball domain 514, is associated with a set of trigger words {basketball, game}, which is a subset of the set of trigger words {sports, football, soccer, game, and basketball} within sports domain 504.

For each selectable domain 502-520, DSP 250 stores a relationship with associated features 522-574 that enable AFE utility 240 to detect each of the words within the associated set of trigger words. For example, for the weather domain 502, DSP 250 stores a relationship with features 522, 524, and 526. Features 522 enable AFE utility 240 to detect the word "rain," features 524 enable AFE utility 240 to detect the word "sunshine,", and features 526 enable AFE utility 240 to detect the word "temperature." As an example, for the food domain 502, DSP 250 stores a relationship with features 536, 538, 540, and 542, which are respectively related to detecting the set of keywords {eat, hungry, restaurant, cafe}. For breakfast domain 516, which is a subdomain of food domain 506, DSP 250 stores a relationship with features 544, 546, and 548, which are respectively related to detecting the set of keywords {breakfast, oatmeal, cereal}. For lunch domain 518, which is a subdomain of food domain 506, DSP 250 stores a relationship with features 550 and 552, which are respectively related to detecting the set of keywords {deliver, McDonald's}. For dinner domain 520, which is a subdomain of food domain 506, DSP 250 stores a relationship with features 554, 556, 558, 560, 562, and 564, which are respectively related to detecting the set of keywords {sushi, pizza, burger, tapas, burrito, steak}. As another example, for the home domain 508, DSP 250 stores a relationship with features 566 and 568, which are respectively related to detecting the set of keywords {ChickFilA, Dollar Tree}, which can be keywords of businesses nearby the home location. As another example, for the mall domain 510, DSP 250 stores a relationship with features 570, 572 and 574, which are respectively related to detecting the set of keywords {ChickFilA, Shoe store, Levi's}. In the example shown in FIG. 5, the set of keywords associated with home domain 508 include businesses nearby the location of the user's home, and the set of keywords associated with mall domain 510 include businesses nearby the current location of the mobile device, when the mobile device determines its location (context) to be at the mall.

The capacity of memory 355 of DSP 250 is limited, so it is important to keep the keywords to a limited number. In some embodiments, the amount of general trigger words can be the limit of the number of dynamically-loaded contextually-relevant trigger words. For example, general trigger words (for example, "Hello Moto," "Hey Google," or "Alexa") stored in memory 355 of DSP 250 can be replaced by the same quantity of dynamically-loaded contextually-relevant trigger words. In some embodiments, the number of keywords is not limited by the number of general trigger words, but instead by a different factor, such as the memory capacity of the DSP or a setting of a maximum-keywords limit.

Figure 6A:
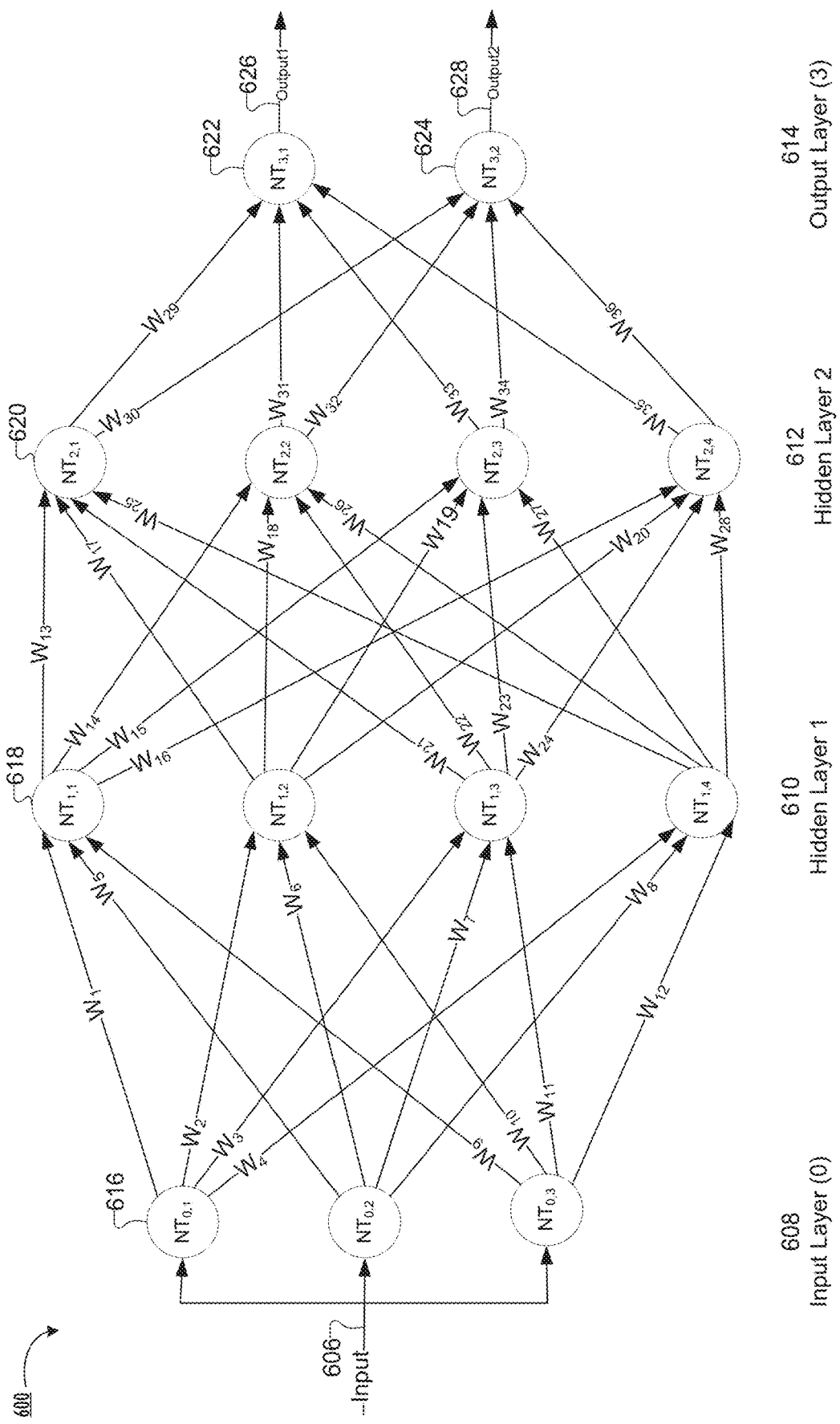
FIGS. 6A, 6B, and 6C illustrate example neural network structures, according to one or more embodiments.
Figure 6B:
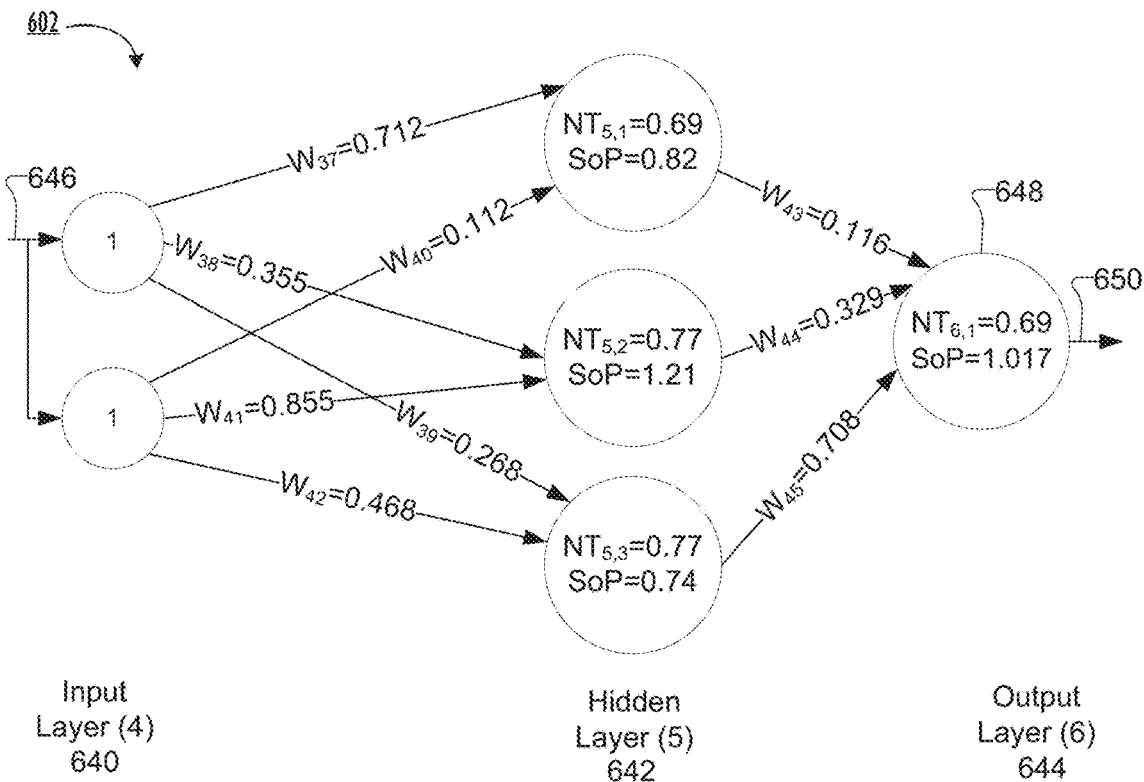
Figure 6C:
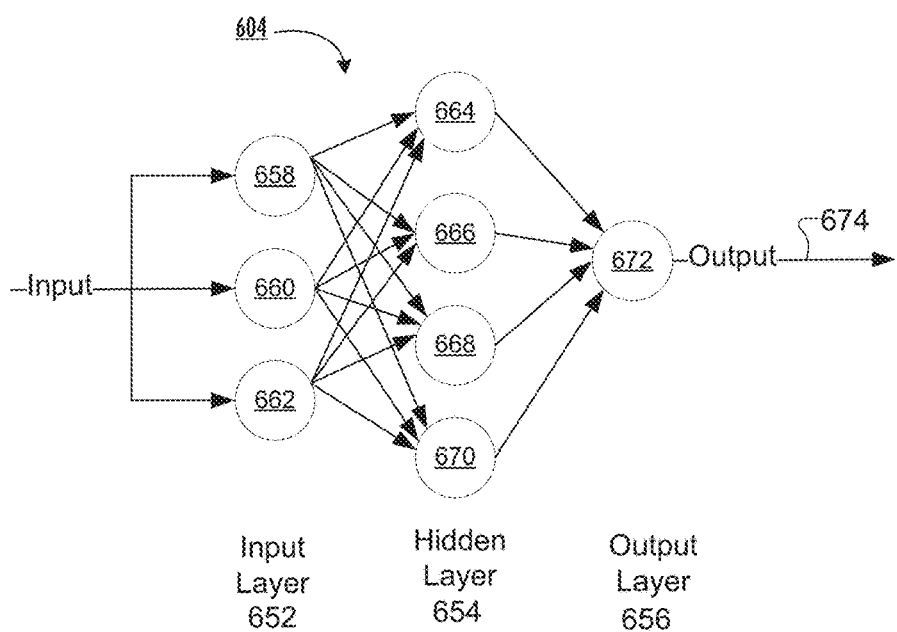

With reference now to FIGS. 6A, 6B, and 6C, there are illustrated example neural network structures 600, 602, and 604 that can be used by AFE utility 240. The first neural network structure 600 can be a multi-domain neural network structure that is configured to be loaded with any of the features stored in feature pool 414 of FIG. 4. The second neural network structure 602 can be a domain-specific neural network structure that is configured for one domain, such as for the weather domain 502 of FIG. 5. The third neural network structure 604 can be a different domain-specific neural network structure that is configured for one domain, such as for the food domain 504 of FIG. 5. The embodiments of neural network structures 600, 602, and 604 illustrated in FIGS. 6A, 6B, and 6C, respectively, are for illustration only, and other neural network structures used by AFE utility 240 could have the same or different configuration.

In each of FIGS. 6A, 6B, and 6C, the features are shown as follows: each node of the neural network structure is represented by a circle; each layer of the neural network structure is represented by a column of circles; each neural network connection weight is represented by an arrow, and each node threshold is represented by a number within the circle of that node. In each of FIGS. 6A, 6B, and 6C, every node contains an activation function that defines the calculation that occurs at that node. One example activation function calculates a sum of products, compares the sum of products to the node threshold, and outputs a likelihood value (e.g., the sum of products, or positive one (1)) if the sum of products meets or exceeds the node threshold, but outputs an unlikelihood value (e.g., a zero, or negative one (−1)) if the node threshold is greater than the sum of products. In this example activation function, each product results from each input to a node that is multiplied by the corresponding connection weight, and each sum results from adding the products from each pair of input with connection weight.

With reference now to FIG. 6A, in embodiments that include a multi-domain neural network structure, contextual loader module 412 selects features based on selected domains 410B identified in identification 410A of selected domains. Contextual loader module 412 loads the selected features from feature pool 414 into first neural network structure 600. Contextual loader module 412 loads the selected features by loading neural network connection weights from each of the three nodes of the input layer 608 to each of the four nodes in hidden layer 1 610. Contextual loader module 412 loads neural network connection weights from each of the four nodes of hidden layer 1 610 to each of the four nodes in hidden layer 2 612. Contextual loader module 412 loads neural network connection weights from each of the four nodes of hidden layer 2 612 to the one node of the output layer 614.

As an operational example, if contextual information 402 identifies "morning" time and "home" location as the current context, the selected domains 410B include the weather domain 502 and the breakfast domain 516. As well, contextual loader module 412 selectably loads features 522-526 and features 544-548 into first neural network structure 600. For example, features 522-526 and features 544-548, together, could include four layers 608, 610, 612, and 614. Features 522-526 and features 544-548, together, could designate three nodes into input layer 608, four nodes into hidden layer 1 610, four nodes into hidden layer 2 612, and two nodes into output layer 614. Features 522-526 and features 544-548, together, could include connection weights $W_1$-$W_{36}$ in an arrangement as shown in FIG. 6A and as described in Table 1 of FIG. 6D. Features 522-526 and features 544-548, together, could specify node threshold values $NT_{0,1}$, $NT_{0,2}$, and $NT_{0,3}$ for the nodes of input layer 608 in the first, second, and third rows, respectively. Features 522-526 and features 544-548, together, could specify node threshold values $NT_{1,1}$, $NT_{1,2}$, $NT_{1,2}$, and $NT_{1,4}$ for the nodes of hidden layer 1 610 in the first, second, third, and fourth rows, respectively. Features 522-526 and features 544-548, together, could specify node threshold values $NT_{2,1}$, $NT_{2,2}$, $NT_{2,2}$, and $NT_{2,4}$ for the nodes of hidden layer 2 612 in the first, second, third, and fourth rows, respectively. Features 522-526 and features 544-548, together, could specify node threshold values $NT_{3,1}$ and $NT_{3,2}$ for the nodes of output layer 614 in the first and second rows, respectively.

Contextual loader module 412 sends first neural network structure 600, loaded with the selected features, as the at least one neural network 416. In some alternate embodiments, phrase-spotter 418 retrieves first neural network structure 600, loaded with the selected features, from contextual loader module 412 as the at least one neural network 416. Phrase-spotter 418 uses loaded first neural network structure 600 to detect whether a received audio stream 420 contains audio content that matches a trigger word from among the sets of trigger words {rain, sunshine, and temperature} and {breakfast, oatmeal, cereal} associated with the selected domains 410B of "weather" and "breakfast." For example, if received audio stream 420 contains the voice of someone saying "where can I get some oatmeal?" then phrase-spotter 418 uses the loaded first neural network structure 600 and detects audio content that matches the word "oatmeal."

Particularly, phrase-spotter 418 processes audio stream 420 through each of the three nodes of the input layer 608 of the first neural network structure 600. All of the nodes of input layer 608 receive the same input 606, which includes a full or partial portion of audio stream 420. For ease of explanation, "x" denotes the value of input 606. Every node of input layer 608 executes its activation function, which includes multiplying its input weight value of one (1) by input 606. The first node 616 of input layer 608, which is in the first row, has node threshold value $NT_{0,1}$ of zero (0) in this example; and consequently, the result of its activation function has a value of 1x, which is outputted to all of the nodes of hidden layer 1 610. That is, first node 616 outputs, in association with connection weight $W_1$, the result of its activation function to the first node 618 of hidden layer 1 610. In other words, first node 616 of hidden layer 1 610 associates connection weight $W_1$ with the received output from first node 616. First node 616 outputs, in association with connection weights $W_2$=0.355, $W_3$=0.268, and $W_4$=1.010, respectively, the result of its activation function to the respective second, third, and fourth nodes of hidden layer 1 610. The node threshold values $NT_{0,2}$ and $NT_{0,3}$ of the other nodes in input layer 608 are the value of zero (0) in this example. The other nodes of input layer 608 operate in the same manner as the first node 616 of input layer 608, and therefore generate outputs analogous to first node 616. To avoid iterative descriptions of analogous outputs, this operational example only describes details related to first node 616. In other embodiments, node threshold values $NT_{0,1}$, $NT_{0,2}$, and $NT_{0,3}$ could be greater than zero (0) as well as different values than each other.

Phrase-spotter 418 processes outputs from each of three nodes of input layer 608 through each of the four nodes of hidden layer 1 610 using the selectably loaded features 522-526 and 544-548. Every node of hidden layer 1 610 executes its activation function, which includes calculating a sum of the products of its inputs and connection weights. Particularly, the first node 618 of hidden layer 1 610, which is in the first row, receives inputs from each node of input layer 608. First node 618 multiplies connection weight $W_1$=0.712 by the input (i.e., 1x) received from first node 616 of input layer 608, and determines the product 0.712x. First node 618 multiplies connection weight $W_5$=0.112 by the input (i.e., 1x) received from the second node of input layer 608, and determines the product 0.112x. First node 618 multiplies connection weight $W_9$=0.212 by the input (i.e., 1x) received from the third node of input layer 608, and determines the product 0.212x. First node 618 generates 1.036x as the sum of products by adding the determined products (0.712x+0.112x+0.212x). First node 618 has node threshold value $NT_{1,1}$ of a sixth-nine hundredths (0.69) in this example. First node 618 compares the sum of products (1.036x) to its node threshold value $NT_{1,1}$=0.69, and based on whichever is greater, outputs a likelihood or unlikelihood value (e.g., the sum of products 1.036x as likelihood value in this case) to all of the nodes of hidden layer 2 612. The second, third, and fourth nodes of hidden layer 1 610 operate in the same manner as the first node 618 of hidden layer 1 610, but utilize $NT_{1,2}$=0.77, $NT_{1,3}$=0.68, and $NT_{1,4}$=0.81, respectively. Therefore, the other nodes of hidden layer 1 610 generate outputs analogous to first node 618. To avoid iterative descriptions of analogous outputs, this operational example only describes details related to first node 618.

Phrase-spotter 418 processes outputs from each of four nodes of the hidden layer 1 610 through each of the four nodes of hidden layer 2 612 using the selectably loaded features 522-526 and 544-548. Every node of hidden layer 2 612 executes its activation function, which includes calculating a sum of the products of its inputs and connection weights. Particularly, the first node 620 of hidden layer 2 612, which is in the first row, receives inputs from each node of hidden layer 1 610. First node 620 multiplies connection weight $W_{13}$=0.451 by the input (i.e., 1.036x) received from first node 618 of hidden layer 1 610, and determines the product 0.467x. First node 620 multiplies connection weight $W_{17=0.681}$ by the input (i.e., 1.909x) received from the second node of hidden layer 1 610, and determines the product 1.300x. First node 620 multiplies connection weight $W_{21}$=0.308 by the input (i.e., 2.099x) received from the third node of hidden layer 1 610, and determines the product 0.646x. First node 620 multiplies connection weight $W_{25}$=0.691 by the input (i.e., 1.297x) received from the fourth node of hidden layer 1 610, and determines the product 0.896x. First node 620 generates 3.310x as the sum of products by adding the determined products 0.467x+1.300x+0.646x+0.896x). First node 620 has node threshold value $NT_{2,1}$ of a fifty-four hundredths (0.54) in this example. First node 620 compares the sum of products (3.310x) to its node threshold value $NT_{2,1}$=0.54, and based on whichever is greater, outputs a likelihood or unlikelihood value (e.g., the sum of products 3.310x as likelihood value in this case) to all of the nodes of output layer 614. The second, third, and fourth nodes of hidden layer 2 612 operate in the same manner as the first node 620 of hidden layer 2 612, but utilize $NT_{2,2}$=0.33, $NT_{2,3}$=0.74, and $NT_{2,4}$=0.77, respectively. Therefore, the other nodes of hidden layer 2 612 generate outputs analogous to first node 620. To avoid iterative descriptions of analogous outputs, this operational example only describes details related to first node 620.

Phrase-spotter 418 processes outputs from each of four nodes of the hidden layer2 through the first node 622 and second node 624 of the output layer using the selectably loaded features. Every node of output layer 614 executes its activation function, which includes calculating a sum of the products of its inputs and connection weights. Particularly, the first node 622 of output layer 614, which is in the first row, receives inputs from each node of hidden layer 2 612. First node 622 multiplies connection weight $W_{29}$=0.728 by the input (i.e., 3.310x) received from first node 620 of hidden layer 2 612, and determines the product 2.410x. First node 622 multiplies connection weight $W_{31}$=0.67 by the input (i.e., 5.25x) received from the second node of hidden layer 2 612, and determines the product 3.522x. First node 622 multiplies connection weight $W_{33}$=0.512 by the input (i.e., 1.486x) received from the third node of hidden layer 2 612, and determines the product 0.761x. First node 622 multiplies connection weight $W_{35}$=0.509 by the input (i.e., 1.350x) received from the fourth node of hidden layer 2 612, and determines the product 0.687x. First node 622 generates 7.380x as the sum of products by adding the determined products 2.410x+3.522+0.761x+0.687x). First nodzzze 622 has node threshold value $NT_{3,1}$ of eighty-four hundredths (0.84) in this example. First node 622 compares the sum of products (7.380x) to its node threshold value $NT_{3,1}$=0.84, and based on whichever is greater, outputs a likelihood or unlikelihood value (e.g., the sum of products 7.380x as likelihood value in this case) as first output 626 of neural network structure 600. Phrase-spotter 418 determines whether a word related to breakfast domain 516 is detected based on first output 626. For example, phrase-spotter 418 determines that the trigger word "oatmeal" is detected when first output 626 meets a detection quality metric level, such as being greater than zero or $NT_{3,1}$. To avoid iterative descriptions of analogous outputs, this operational example only describes details related to first node 622.

The second node 624 of output layer 614 operates in the same manner as the first node 620, but utilizes $NT_{3,2}$=5.67. Therefore, second node 624 generates an analogous sum of products having a value of 5.585x, compares it to node threshold value $NT_{3,2}$=5.67, an based on whichever is greater, outputs a likelihood or unlikelihood value (e.g., zero (0) as unlikelihood value in this case). Phrase-spotter 418 determines whether a word related to weather domain 502 is detected based on second output 628. For example, phrase-spotter 418 determines that the trigger word "rain" is not detected within input 606 when second output 628 does not meet a detection quality metric level, such as being greater than zero or $NT_{3,2}$.

In response to detecting audio content that matches the trigger word "oatmeal," AFE utility 240 outputs a wake-up signal to AP 260. The wake-up signal is trigger word identification 422 that identifies "oatmeal" as the trigger word belonging to either or both of the food domain 506 and the breakfast domain 516, which is part of the food domain 506. AP 260 wakes up and performs additional calculations, in response to receiving the trigger word identification 422 as a wake-up signal. That is, DS-ASR 242 transcribes the received audio stream (e.g., the buffered audio stream 424) into a text transcription 436, which is output to an output device (i.e., display 226) of the mobile device. The transcription is performed by waking-up and processing through third DS-ASR 430, which corresponds to the food domain 506. As described more particularly above with reference to keyword-domain selector 432 of FIG. 4, in response to receiving the trigger word identification 422, AP 260 wakes up and executes keyword-domain controller 432, which selectably activates the domain-specific ASR engine (from among the multiple domain-specific ASR engines 426, 428, and 430) which corresponds the same domain associated with the detected trigger word (i.e., trigger word identification 422). By waking up only third DS-ASR 430, instead of a general-purpose ASR, AP 260 transcribes the received audio stream more accurately than if the general-purpose ASR were used. In some embodiments, AP 260 outputs the text transcription 436 to an external device (e.g., server 150 of FIG. 1), and receives a response (for example, a list of nearby locations where oatmeal can be purchased) from the external device, where the response is based on the text transcription 436. AP 260 can perform additional processing based on the trigger word identification 422, such as outputting, via a display (e.g., display 226 of FIG. 2), the response (for example, a list of nearby locations where oatmeal can be purchased) received from the external device.

With reference now to FIGS. 6B and 6C, in embodiments that include multiple domain-specific neural network structures, the contextual loader module 412 selects features based on the identification 410A of selected domains, and loads the selected features from the feature pool 414 into a domain-specific neural network structure related to the same domain as the selected features. As shown in FIG. 6B, when identification 410A of selected domains identifies sports domain 504, then contextual loader module 412 selectably loads features 528-534 into second neural network structure 602. For example, features 528-534 could designate three layers that include two nodes into input layer 640, three nodes into hidden layer 642, and one node into output layer 644. Features 528-534 could specify that every node of input layer 640 executes its activation function, which includes multiplying its input weight value of one (1) by input 646. Features 528-534 could include connection weights $W_{37}$-$W_{45}$ in an arrangement and with values as shown in FIG. 6B. Features 528-534 could specify node threshold values $NT_{5,1}$, $NT_{5,2}$, and $NT_{5,3}$ for the nodes of hidden layer 642 in the first, second, and third rows, respectively. Features 528-534 could specify node threshold value $NT_{6,1}$ for the node of output layer 644. the output layer 644. All of the nodes of input layer 640 receive the same input 646, which includes a full or partial portion of audio stream 420. Every node of second neural network structure 602 executes its activation function, which includes calculating a sum of the products (shown in FIG. 6B as SoP) of its inputs and connection weights. Output node 648 compares its sum of products (SoP=0.82) to its node threshold value $NT_{6,1}$=0.69, and based on whichever is greater, outputs a likelihood or unlikelihood value (e.g., the sum of products 1.017 as likelihood value in this case) as output 650 of second neural network structure 602. Phrase-spotter 418 determines whether a word related to sports domain 504 is detected based on output 650. For example, phrase-spotter 418 determines that the trigger word "football" is detected when output 650 meets a detection quality metric level, such as being greater than zero or $NT_{6,1}$.

As shown in FIG. 6C, when identification 410A of selected domains identifies food domain 506, then contextual loader module 412 selectably loads features 536-564 into third neural network structure 604. Contextual loader module 412 loads the selected features by loading neural network connection weights between each of the three nodes of the input layer 652 to each of the four nodes in the hidden layer 654. Contextual loader module 412 loads neural network connection weights between each of the four nodes of the hidden layer 654 to the one node of the output layer 656. All of the nodes of input layer 652 receive the same input (which could be the same as input 646 of FIG. 6B), which includes a full or partial portion of audio stream 420. Every node of third neural network structure 604 executes its activation function, which includes calculating a sum of the products of its inputs and connection weights, and comparing the sum of products to a corresponding node threshold value. Nodes 658, 660, 662 of input layer 652 operate in an analogous manner as the three nodes of input layer 608 of FIG. 6A. Nodes 664, 666, 668, and 670 of hidden layer 654 operate in an analogous manner as the four nodes of hidden layer 610 of FIG. 6A, but providing outputs to the output node 672. Output node 672 operates in an analogous manner as the output node 648 of FIG. 6B. To avoid iterative descriptions of analogous outputs, only details related to output 674 will be described. Output node 672 compares its sum of products to its node threshold value, and based on whichever is greater, outputs a likelihood or unlikelihood value as output 674 of third neural network structure 604. Phrase-spotter 418 determines whether a word related to food domain 504 is detected based on output 674. For example, phrase-spotter 418 determines that the trigger word "pizza" is detected when output 674 meets a detection quality metric level, such as being greater than zero or the node threshold value of output node 672.

As an operational example, if contextual information 402 identified "evening" time, "home" location, and "weekend" date as the current context, selected domains 410B include the sports domain 504 and the food domain 504, and contextual loader module 412 selectably loads features 528-534 into second neural network structure 602 and loads features 536-564 into third neural network structure 604. Particularly, second neural network structure 602 (loaded with selected features 528-534) as well as third neural network structure 604 (loaded with selected features 536-564) are selected from contextual loader module 412 as the at least one neural network 416. Phrase-spotter 418 uses the loaded second and third neural network structures 602 and 604 to detect whether a received audio stream 420 contains audio content that matches a trigger word from among the sets of trigger words {football, soccer, game, basketball} and {eat, hungry, restaurant, café, breakfast, oatmeal, cereal, deliver, McDonalds's, sushi, pizza, burger, tapas, burrito, steak} associated with the selected domains 410B of "sports" and "food." If received audio stream 420 contains the voice of someone saying "where do you want to order pizza from?" then the phrase-spotter 418 uses the loaded second and third neural network structures 602 and 604 and detects audio content that matches the word "pizza." Particularly, phrase-spotter 418 processes the audio stream 420 through the input layer 640 and 652, hidden layer 642 and 654, and output layer 644 and 656 of both the second and third neural network structures 602 and 604. The phrase-spotter 418 does not detect audio content matching the word "pizza" by using the second neural network structure 602 because none of the selectably loaded features 528-534 include or correspond to (i.e., enable detection of) the word "pizza." Phrase-spotter 418 detects audio content matching the word "pizza" by using the third neural network structure 604 because the selectably loaded features 556 include or correspond to (i.e., enable detection of) the word "pizza." In response to detecting audio content that matches the trigger word "pizza," AFE utility 240 outputs a wake-up signal to AP 260. The wake-up signal is trigger word identification 422 that identifies "pizza" as the trigger word belonging to the food domain 506. AP 260 wakes up and performs additional calculations, in response to receiving the trigger word identification 422 as a wake-up signal. DS-ASR 242 transcribes the received audio stream (e.g., the buffered audio stream 424) into a text transcription 436, which is output to an output device (i.e., display 226) of the mobile device. The transcription is performed by waking-up and processing through third DS-ASR 430, which corresponds to the food domain 506. In some embodiments, AP 260 outputs the text transcription 436 to an external device, and receives a response (for example, a list of nearby restaurants that serve pizza) from the external device, where the response is based on the text transcription 436. AP 260 can perform additional processing based on the trigger word identification 422, such as outputting, via a display (e.g., display 226 of FIG. 2), the response (for example, a list of nearby restaurants that serve pizza) received from the external device.

As another operational example, if contextual information 402 identifies "evening" time, "home" location, and "weekend" date as the current context, the selected domains 410B include the sports domain 504 and the food domain 504. Also, if received audio stream 420 contains the voice of someone saying "do you want to watch football on the television?" then phrase-spotter 418 uses loaded second and third neural network structures 602 and 604 and detects audio content that matches the word "football." Particularly, phrase-spotter 418 processes the audio stream 420 using the second and third neural network structures 602 and 604. The phrase-spotter 418 does not detect audio content matching the word "football" by using the third neural network structure 604 because none of the selectably loaded features 536-564 enable detection of (e.g., correspond to) the word "football." Phrase-spotter 418 detects audio content matching the word "football" by using the second neural network structure 602 because the selectably loaded features 528 enable detection of the word "football." In response to detecting audio content that matches the trigger word "football," AFE utility 240 outputs a wake-up signal to AP 260. The wake-up signal is trigger word identification 422 that identifies "football" as the trigger word belonging to the sports domain 504. AP 260 wakes up and performs additional calculations, in response to receiving the trigger word identification 422 as a wake-up signal. That is, DS-ASR 242 transcribes the received audio stream (e.g., the buffered audio stream 424) into a text transcription 436, which is output to an output device (i.e., display 226) of the mobile device. The transcription is performed by waking-up and processing through second DS-ASR 428, which corresponds to the sports domain 506. In some embodiments, AP 260 outputs the text transcription 436 to an external device, and receives a response (for example, a list television channels broadcasting football and soccer games) from the external device that is based on the text transcription 436. AP 260 can perform additional processing based on the trigger word identification 422, such as outputting, via a display (e.g., display 226 of FIG. 2), the response (for example, the list television channels broadcasting football and soccer games) received from the external device.

Figure 7A:
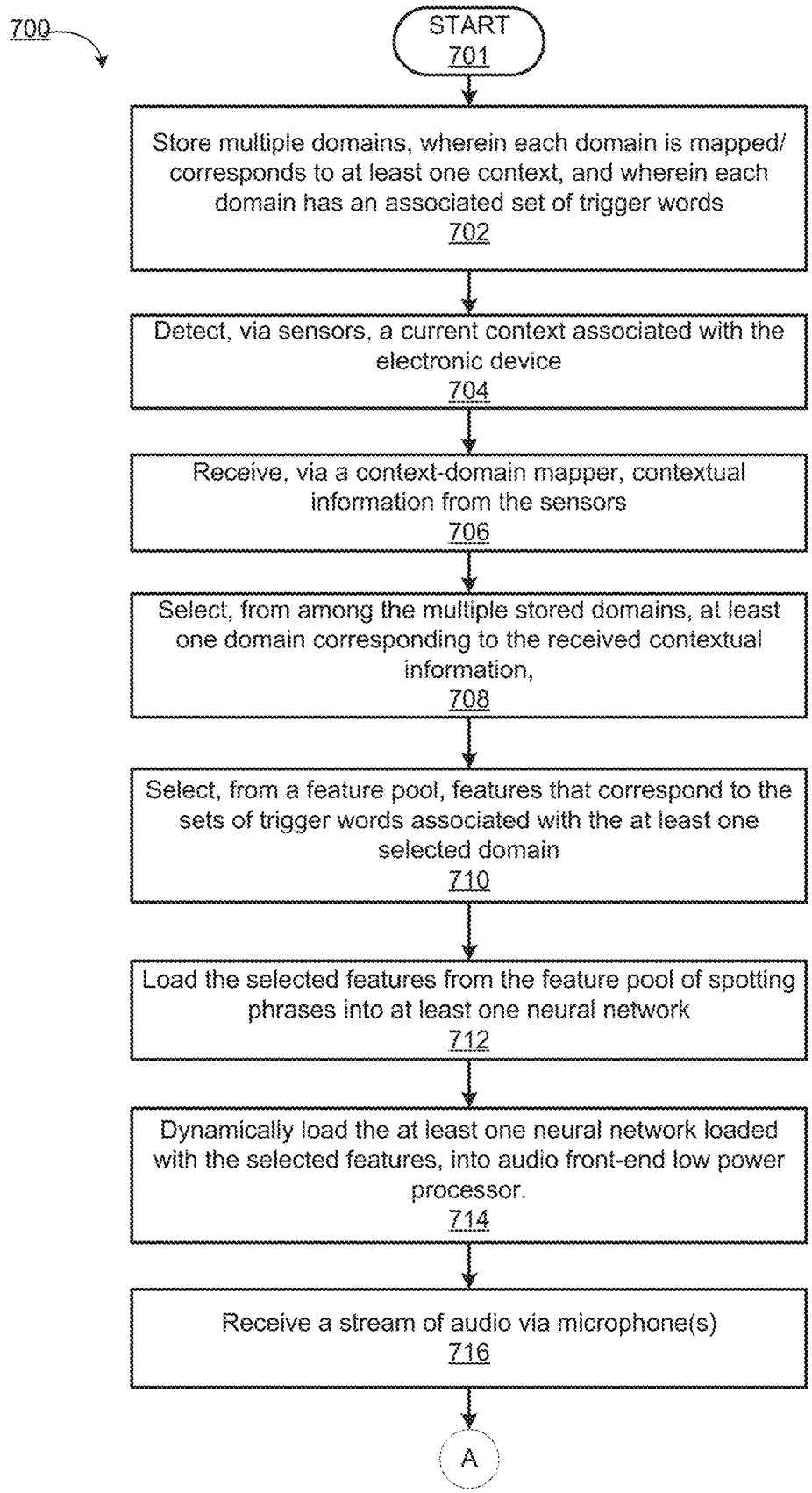
FIG. 7 (FIGS. 7A and 7B) provides a flowchart illustrating a method for operating a dynamically loaded phrase spotting audio-front end system of a mobile device, in accordance with one or more embodiments of this disclosure.
Figure 7B:
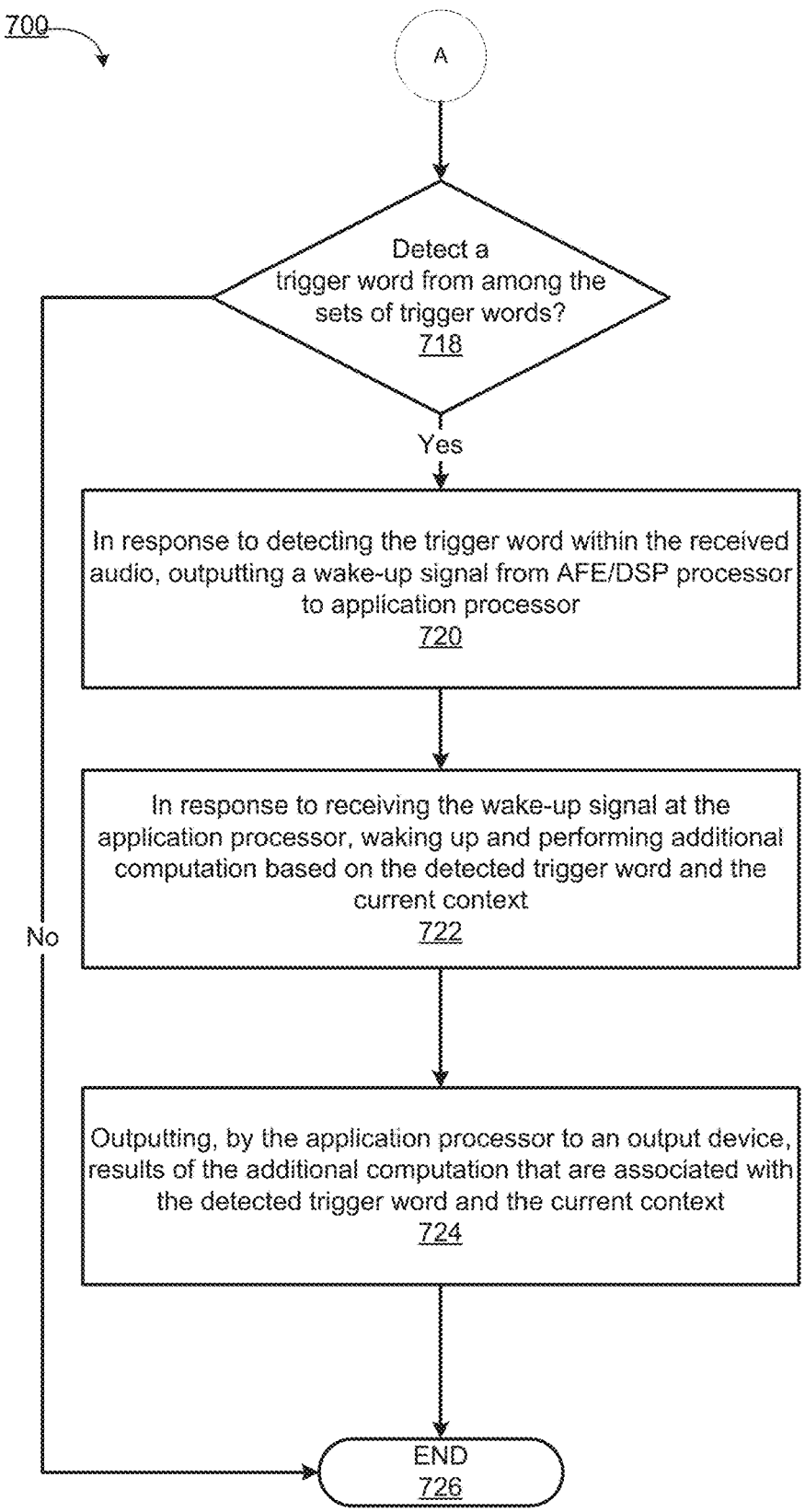

With reference now to FIG. 7, there is illustrated a flowchart illustrating a method 700 for operating a dynamically loaded phrase spotting audio-front end system of a mobile device (e.g., DPS 100 or mobile device 200), in accordance with one or more embodiments of this disclosure. Aspects of method 700 are described with reference to the components of FIGS. 1 through 6C. Several of the processes of the method provided in FIG. 7 can be implemented by one or more processors (e.g., DSP 250 and application processor(s) 260) executing software code of AFE utility 240 and DS-ASR 242 within a data processing system (e.g., DPS 100 or mobile device 200). The method processes described in FIG. 7 are generally described as being performed by DSP 250 executing AFE utility 240 and by AP 260 executed ASR engine 242, which uses other components of mobile device 200.

Method 700 commences at the start block, then proceeds to block 702. At block 702, multiple domains (for example, N selectable domains 502-520) are stored in memory of DSP 208. Each selectable domain is mapped or otherwise corresponds to at least one context. Each domain has an associated set of trigger words. For example, as shown in FIG. 4, context-to-domain mapping module 408 stores N domains 502-520. The context-to-domain mapping module 408 stores relationships between different context combinations and each of the N domains, such as "morning" time and "home" location contexts, which are mapped to the "weather" and food domains 502 and 506. Also, as shown in FIG. 5, weather domain 502 is associated with a set of keywords {rain, sunshine, temperature}.

In some embodiments, storing multiple domains, at block 702 of method 700, further includes updating a relationship between a selectable domain and set of trigger words associated with the selectable domain. In one embodiment, the updating process includes: for the selectable domain, updating, based on machine learning of experience and habits of a user of the electronic device, a relationship between the selectable features and the selectable domain.

At block 704 of the method, mobile device 200 detects, via sensors, a current context associated with the electronic device. For example, as shown in FIG. 2, GPS MOD 258 detects current context such as the geographical location of mobile device 200. Also, as shown in FIG. 2, gyroscope 257 and accelerometer 256 detect current context such as a motion of mobile device 200. For another example, as shown in FIG. 4, sensors 404 detect current context such as ambient light level and battery power level. At block 706, AFE utility 240 receives, from a context-domain mapper, contextual information from the sensors. For example, as shown in FIG. 4, context-to-domain mapping module 408 receives contextual information 402 from sensors 404. At block 708, AFE utility 240 selects, from among the multiple stored domains, at least one domain corresponding to the received contextual information. At block 710, AFE utility 240 selects, from a feature pool, features that correspond to the sets of trigger words associated with the at least one selected domain. For example, as shown in FIG. 5, when context-to-domain mapping module 408 selects weather and sports domains 502 and 504, contextual loader module 412 selects features 522-526 and features 528-534 that respectively correspond to the sets of trigger words {rain, sunshine, temperature} and {football, soccer, game, basketball} associated with the selected weather and sports domains 502 and 504. At block 712, AFE utility 240 loads the selected features into at least one neural network. For example, as shown in FIG. 4, contextual loader module 412 loads selected features 522-526 and features 528-534, which respectively correspond to the weather and sports domains 502 and 504, into first neural network structure 600. At block 714, AFE utility 240 dynamically loads the at least one neural network 416 and selected features (i.e., neural network connection weights) into the phrase-spotting AFE processor. For example, as shown in FIG. 4, phrase-spotter 418 dynamically loads the first neural network structure 600 (into which the selected features have been loaded) from contextual loader module 412. At block 716, AFE utility 240 receives a stream of audio via microphones(s). For example, as shown in FIG. 4, phrase-spotter 418 receives the audio stream 420 from microphone(s) 285. At block 718, AFE utility 240 determines whether a trigger word from among the sets of trigger words associated with the at least one selected domain is detected within the received audio stream. For example, as shown in FIG. 4, DSP 250 processes audio stream 420 through the dynamically-loaded phrase-spotting algorithm within phrase-spotter 418 to determine whether audio stream 420 contains audio content matching a trigger word (i.e., whether a trigger word is detected). For another example, as shown in FIG. 5, when identification 410A of selected domains identifies a subdomain (e.g., football domain 512), phrase-spotter 418 processes the audio stream 420 through the dynamically-loaded phrase-spotting algorithm to determine whether a football-related word from the set of trigger words {football, soccer, game} is detected.

At block 720, in response to detecting audio content that matches a trigger word from among the sets of trigger words associated with the at least one selected domain, AFE utility 240 outputs a wake-up signal to an application processor. AFE processor 240 utilizes less computational resources than AP 260. AFE processor 240 can consume less computational resources while allowing AP 260 to sleep, and sleep utilizes less computational resources than being awake. For example, as shown in FIG. 4, AFE utility 240 outputs to AP 260 an identification (422) of which trigger word was detected, and trigger word identification 422 operates a wake-up signal to AP 260. At block 722, in response to receiving the wake-up signal from AFE utility 240, AP 260 wakes up and performs additional computation based on the matching trigger word and the at least one current context. For example, as shown in FIG. 4, in response to receiving the trigger word identification 422 from phrase-spotter 418, keyword-domain controller 432 selectably activates the domain-specific ASR engine, which transcribes the audio stream 420 or buffered audio stream 424 into a text format. At block 724, AP 260 outputs one or more results of the additional computation associated with the matching trigger word and the at least one current context. For example, as shown in FIG. 4, AP 260 outputs text transcription 436 (e.g., "where do you want to order pizza from?") from third DS-ASR 430 which is associated with the matching trigger word (e.g., "pizza") and which is related to current context of "evening" time, "home" location, and "weekend." The current context is the basis upon which the selected domains 410B that are identified in the identification 410A are selected, and consequently, the selected domains 410B are contextually-relevant. In some embodiments, AP 260 outputs the text transcription 436 to an external device (e.g., server 150 of FIG. 1), and receives a response (for example, a list of nearby locations where pizza can be ordered) from the external device, where the response is based on the text transcription 436. AP 260 performs additional processing based on the trigger word identification 422, such as outputting, via a display (e.g., display 226 of FIG. 2), the response (for example, a list of nearby locations where pizza can be ordered) received from the external device.

As a further result, the current context is the basis upon which the features are selected from the feature pool 414, as the features are selected based on the contextually-relevant selected domains. Method 700 proceeds from block 724 to end block 726. If no trigger word is detected, the method proceeds from block 718 to end block 726, where audio stream 420 is discarded and is thus not subjected to any ASR processing.

In the above-described flowcharts of FIG. 7, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   detecting, by at least one sensor, at least one current context associated with an electronic device;
   dynamically loading at least one neural network and selected features into a phrase-spotting audio front-end (AFE) processor, the neural network configured, based on the current context, with at least one domain that has an associated set of at least one trigger word;
   detecting, within a received audio stream, audio content that matches a trigger word from among the sets of trigger words associated with the at least one selected domain, the detecting performed using the at least one neural network;
   in response to detecting audio content that matches the trigger word, transmitting a wake-up signal from the AFE processor to an application processor (AP), wherein the AFE processor utilizes less computational resources than the AP;
   in response to receiving the wake-up signal from AFE processor, the AP waking up and performing additional computation based on the matching trigger word and the at least one current context; and
   outputting, by the AP to an output device, one or more results of the additional computation that are associated with the matching trigger word and the at least one current context.

2. The method of claim 1, wherein the dynamically loading comprises:
   receiving contextual information from at least one of a communication network and at least one sensor of the at least one sensor, wherein the contextual information identifies the at least one current context;
   selecting, from among multiple domains that are selectable by the electronic device, at least one domain corresponding to the received contextual information, wherein each domain has an associated set of trigger words; and
   selecting and loading the features into the at least one neural network, wherein the selected features correspond to detecting the sets of trigger words associated with the at least one selected domain, wherein the selected features are selected from among selectable features stored in a feature pool, and wherein the feature pool stores selectable features for each trigger word associated with each of the multiple domains.

3. The method of claim 2, further comprising updating a relationship between a selectable domain and set of trigger words associated with the selectable domain, wherein the updating includes:
   for the selectable domain, updating, based on machine learning of experience and habits of a user of the electronic device, a relationship between the selectable features and the selectable domain.

4. The method of claim 2, further comprising:
   storing, in a memory of the electronic device, a context-to-domain mapping module that stores:
      multiple domains that are selectable by the electronic device; and
      for each set of the multiple domains, a relationship with each detectable context that can be detected by the at least one sensor or received via the communication network,
   wherein the at least one selected domain includes a subdomain that is part of a superdomain and that corresponds to a subset of trigger words from among the set of trigger words that correspond to the superdomain; and
   detecting, by the AFE processor, a trigger word from among the subset of trigger words corresponding to the subdomain.

5. The method of claim 2, wherein:
   the received contextual information includes an identification of the user of the electronic device; and
   the selecting of the at least one domain comprises:
      selecting a first domain associated with a first user identification when the contextual information comprises the first user identification; and
      selecting a second domain associated with a second user identification when the contextual information comprises the second user identification.

6. The method of claim 1, wherein the at least one current context comprises at least one of: time; date; location of the electronic device; environment of the electronic device; weather; or motion of the electronic device.

7. The method of claim 6, wherein selecting the at least one domain corresponding to the received contextual information comprises one of:
   selecting a first set of domains as the at least one domain, in response to the contextual information identifying that the at least one current context includes:
      a first context from among the at least one current context, the first context being within a first context range; and
      a second, different context from among the at least one current context, the second context being within a second context range;
      wherein the set of trigger words associated with the first set of domains includes trigger words associated with the first context within the first context range, and trigger words that are associated with the second context within the second range; and
   alternatively selecting a second set of domains as the at least one domain, in response to the contextual information identifying that the at least one current context includes at least one of the first context and the second context outside a respective one of the first context range and the second context range.

8. The method of claim 1, further comprising selectively adjusting computational complexity of a phrase spotting algorithm that is used in the detection of the trigger word within the received audio stream, the selectively adjusting comprising:
applying a higher computational complexity when the at least one current context includes a battery power level within an upper battery power level range; and
applying a lower computational complexity when the at least one current context includes a battery power level outside the upper battery power level range.

9. The method of claim 1, wherein performing the additional computation by the AP comprises:
in response to receiving the wake-up signal that identifies the detected trigger word, selecting a domain-specific automatic speech recognition (ASR) engine that corresponds to the at least one selected domain of the detected trigger word;
waking up the selected domain-specific ASR engine; and
processing the received audio stream through the selected domain-specific ASR engine to generate the one or more results of the additional computation that are associated with the detected trigger word and the at least one current context.

10. The method of claim 1, further comprising selectively adjusting a detection quality metric of a phrase spotting algorithm that is used in the detection of the trigger word within the received audio stream, the selectively adjusting comprising:
applying a higher detection quality metric when the at least one current context includes an ambient noise level within an upper ambient noise level range; and
applying a lower detection quality metric when the at least one current context includes an ambient noise level outside the upper ambient noise level range.

11. An electronic device comprising:
at least one sensor that detects at least one current context associated with the electronic device;
a memory storing a contextual loader module that dynamically loads at least one neural network and selected features into a phrase-spotting audio front-end (AFE) processor, the neural network configured, based on the current context, with at least one domain that has an associated set of at least one trigger word;
an application processor (AP);
an output device;
the AFE processor coupled to the at least one sensor, the memory, and the AP, and executes the contextual loader module, which enables the electronic device to:
dynamically load the at least one neural network and the selected features into the AFE processor;
detect, within a received audio stream, audio content that matches a trigger word from among the sets of trigger words associated with the at least one selected domain, the detecting performed using the at least one neural network; and
in response to detecting audio content that matches the trigger word within the received audio stream, transmitting a wake-up signal from the AFE processor to an application processor (AP), wherein the AFE processor utilizes less computational resources than the AP, and wherein the wake-up signal triggers the AP to perform additional computation based on the matching trigger word and the at least one current context;
wherein the application processor outputs, to the output device, one or more results of the additional computation that are associated with the matching trigger word and the at least one current context.

12. The electronic device of claim 11, wherein the electronic device dynamically loads by:
receiving contextual information from at least one of a communication network and at least one sensor of the at least one sensor, wherein the contextual information identifies the at least one current context;
selecting, from among multiple domains that are selectable by the electronic device, at least one domain corresponding to the received contextual information, wherein each domain has an associated set of trigger words; and
selecting and loading the features into the at least one neural network, wherein the selected features correspond to detecting the sets of trigger words associated with the at least one selected domain, wherein the selected features are selected from among features stored in a feature pool, and wherein the feature pool stores features for each trigger word associated with each of the multiple domains.

13. The electronic device of claim 12, wherein the AFE processor enables the electronic device to update a relationship between a selectable domain and set of trigger words associated with the selectable domain, wherein the updating includes:
for each trigger word within each set of trigger words that is associated with each of the N domains, storing, in a feature pool, features that are selectable by the electronic device;
for the selectable domain, self-adjusting a relationship between the selectable features and the selectable domain, wherein the self-adjusting is based on machine learning of experience and habits of a user of the electronic device.

14. The electronic device of claim 12, wherein the memory further stores a context-to-domain mapping module that:
stores multiple domains that are selectable by the electronic device;
for each set of the multiple domains, stores a relationship with each detectable context that can be detected by the at least one sensor or received via the communication network,
wherein the at least one selected domain includes a subdomain that is part of a superdomain and that corresponds to a subset of trigger words from among the set of trigger words that correspond to the superdomain; and
when executed by the AFE processor, enables the electronic device to detect a trigger word from among the subset of trigger words corresponding to the subdomain.

15. The electronic device of claim 11, wherein the at least one current context comprises at least one of: time; date; location of the electronic device; environment of the electronic device; weather; or motion of the electronic device.

16. The electronic device of claim15, wherein the AFE processor enables the electronic device to select the at least one domain corresponding to the received contextual information by one of:
selecting a first set of domains as the at least one domain, in response to the contextual information identifying that the at least one current context includes:
a first context from among the at least one current context, the first context being within a first context range; and a second, different context from among the at least one current context, the second context being within a second context range;
wherein the set of trigger words associated with the first set of domains includes:
trigger words associated with the first context within the first context range, and
trigger words that are associated with the second context within the second range; and
alternatively selecting a second set of domains as the at least one domain, in response to the contextual information identifying that the at least one current context includes at least one of the first context outside a respective one of the first context range and the second context range.

17. The electronic device of claim 11, wherein the memory stores a machine learning utility, which when executed by a processor of the electronic device, enables the electronic device to selectively adjust computational complexity of a phrase spotting algorithm that is used in the detection of the trigger word within the received audio stream, the selectively adjusting comprising:
applying a higher computational complexity when the at least one current context includes a battery power level within an upper battery power level range; and
applying a lower computational complexity when the at least one current context includes a battery power level outside the upper battery power level range.

18. The electronic device of claim 11, wherein the AP is configured to perform the additional computation by:
in response to receiving the wake-up signal that identifies the detected trigger word, selecting a domain-specific automatic speech recognition (ASR) engine that corresponds to the at least one domain of the detected trigger word;
waking up the selected domain-specific ASR engine; and
processing the received audio stream through the selected domain-specific ASR engine to generate the one or more results of the additional computation that are associated with the detected trigger word and the at least one current context.

19. A computer program product comprising:
a non-transitory computer readable storage device;
program code on the computer readable storage device that when executed by a phrase-spotting audio front-end (AFE) processor associated with an electronic device, the program code enables the electronic device to provide the functionality of:
detecting, by at least one sensor, at least one current context associated with an electronic device;
dynamically loading at least one neural network and selected features into the AFE processor, the neural network configured, based on the current context, with at least one domain that has an associated set of at least one trigger word;
detecting, within a received audio stream, audio content that matches a trigger word from among the sets of trigger words associated with the at least one selected domain, the detecting performed using the at least one neural network;
in response to detecting audio content that matches the trigger word within the received audio stream, transmitting a wake-up signal from the AFE processor to an application processor (AP), wherein the AFE processor utilizes less computational resources than the AP;
in response to receiving the wake-up signal, the AP waking up and performing additional computation based on the detected trigger word and the at least one current context; and
outputting, by the AP to an output device, one or more results of the additional computation that are associated with the detected trigger word and the at least one current context.

20. The computer program product of claim 19, wherein the dynamically loading comprises:
receiving contextual information from at least one of a communication network and at least one sensor of the at least one sensor, wherein the contextual information identifies the at least one current context;
selecting, from among multiple domains that are selectable by the electronic device, at least one domain corresponding to the received contextual information, wherein each domain has an associated set of trigger words; and
selecting and loading the features into the at least one neural network, wherein the selected features correspond to detecting the sets of trigger words associated with the at least one selected domain, wherein the selected features are selected from among selectable features stored in a feature pool, and wherein the feature pool stores selectable features for each trigger word associated with each of the multiple domains.

* * * * *